United States Patent
Park et al.

(10) Patent No.: US 8,286,445 B2
(45) Date of Patent: Oct. 16, 2012

(54) WATER-COOLED AIR CONDITIONER

(75) Inventors: In Woong Park, Changwon-si (KR); Ja Hyung Koo, Changwon-si (KR); Seung Cheol Baek, Changwon-si (KR); Soo Yeon Shin, Gimhae-si (KR); Dong Hyuk Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 816 days.

(21) Appl. No.: 11/806,457

(22) Filed: May 31, 2007

(65) Prior Publication Data

US 2008/0087030 A1     Apr. 17, 2008

(30) Foreign Application Priority Data

Oct. 17, 2006  (KR) .................. 10-2006-0100610

(51) Int. Cl.
  *F25B 39/04*    (2006.01)
(52) U.S. Cl. ....................................................... 62/506
(58) Field of Classification Search ............... 62/506, 62/305

See application file for complete search history.

(56) References Cited

U.S. PATENT DOCUMENTS

| | | | | |
|---|---|---|---|---|
| 3,431,750 A * | 3/1969 | Lefranc ................ 62/51.2 |
| 3,945,432 A * | 3/1976 | Tamblyn .............. 165/210 |
| 4,373,346 A * | 2/1983 | Hebert et al. ........... 62/79 |
| 4,538,418 A * | 9/1985 | Lawrence et al. ...... 62/79 |
| 4,738,305 A | 4/1988 | Bacchus |
| 4,748,821 A | 6/1988 | Berenter |
| 4,785,640 A | 11/1988 | Naruse |
| 4,796,436 A | 1/1989 | Voorhis et al. |
| 4,865,124 A * | 9/1989 | Dempsey ............... 165/163 |
| 4,959,971 A | 10/1990 | Minari |
| 5,761,921 A | 6/1998 | Hori et al. |
| 6,276,152 B1 * | 8/2001 | Sibik ..................... 62/201 |
| 7,040,380 B1 * | 5/2006 | O'Brien ................ 165/67 |
| 7,340,912 B1 * | 3/2008 | Yoho et al. ............. 62/305 |
| 2004/0188082 A1 | 9/2004 | Riello |
| 2005/0091998 A1 * | 5/2005 | Cho et al. ............. 62/175 |
| 2005/0092000 A1 | 5/2005 | Hwang et al. |
| 2005/0210910 A1 | 9/2005 | Rigney et al. |
| 2005/0217292 A1 | 10/2005 | Onishi et al. |
| 2006/0117768 A1 | 6/2006 | Lee et al. |
| 2006/0117773 A1 | 6/2006 | Street et al. |
| 2006/0123834 A1 | 6/2006 | Hwang et al. |
| 2007/0000274 A1 * | 1/2007 | Li ........................ 62/305 |

FOREIGN PATENT DOCUMENTS

| | | |
|---|---|---|
| CN | 1212352 A | 3/1999 |
| CN | 1661286 | 8/2005 |
| CN | 1782559 | 6/2006 |
| JP | EP1780479 * | 6/2005 |
| KR | 2002-0020392 A | 3/2002 |

* cited by examiner

*Primary Examiner* — Cheryl J Tyler
*Assistant Examiner* — Lakiya Rogers
(74) *Attorney, Agent, or Firm* — McKenna Long & Aldridge LLP

(57) ABSTRACT

A water-cooled air conditioning system includes an indoor unit having a first heat exchanger where air and refrigerant are heat-exchanged with each other, an outdoor unit having a second heat exchanger where water and the refrigerant are heat-exchanged with each other, a cooling tower for cooling the water directed to the second heat exchanger, a discharge duct for guiding the air conditioned in the indoor unit to an indoor space for an air conditioning, and an intake duct for guiding the air in the indoor space to the indoor unit. The second heat exchanger is a plate type heat exchanger having a space that is divided into a plurality of sections along which the refrigerant and the cooling water separately flow.

12 Claims, 13 Drawing Sheets

WATER-COOLED AIR CONDITIONER

This application claims the benefit of Korean Application No. 2006-0100610, filed on Oct. 17, 2006 which is hereby incorporated by reference as if fully set forth herein.

BACKGROUND OF THE INVENTION

1. Field of the Invention

The present invention relates to a water-cooled air conditioning system, and more particularly, to an air conditioning system having a water-cooled heat exchanger having a plate-shaped heat exchanger in which refrigerant and cooling water flow in an opposite direction to each other and a plurality of performance improving devices and allowing outdoor air to be introduced into an indoor space.

2. Description of the Related Art

Generally, an air conditioner is designed to heat or cool indoor air of an office or a house while forming a series of refrigerant cycle such as compression-condensation-expansion-evaporation. The air conditioner heats or cools air in a desired space by allowing the refrigerant to be heat-exchanged with the air.

Recently, as the quality of the life is improved and in response to the needs of the customers, in addition to the air cooling/heating function, the air conditioner also provides a variety of other functions such as an air cleaning function for discharging purified air into the indoor space after filtering off foreign objects contained in sucked air or a dehumidifying function for discharging dry air into the indoor space after changing humid sucked air into the dry air.

As is well known, the air conditioner is generally classified into a split type air conditioner where the outdoor and indoor units are separately installed and an integral type air conditioner where the outdoor and indoor units are integrally installed. The split type air conditioner has been widely used due to its advantages in terms of an installation space and noise.

In order to substitute for an air-cooled air conditioner where the refrigerant is heat-exchanged with air for the air-conditioning of the indoor space, a water-cooled air conditioner where the refrigerant is heat-exchanged with water has been increasingly developed. The water-cooled air conditioner is under active development as an alternative for overcoming excessive power consumption problem of the air-cooled air conditioner.

Merits of the water-cooled air conditioner compared with the air-cooled air conditioner are that a size is relatively small, noise is relatively low, and air is effectively conditioned. Therefore, as the construction of the big buildings and apartments increases, the production and development of the water-cooled air conditioners are on the increase.

The conventional water-cooled air conditioner typically includes a plurality of components such as a compressor, a heat exchanger, and the like.

The refrigerant compressed in the compressor flows into the heat exchanger to be heat-exchanged with the water.

The water and the refrigerant separately pass through the heat exchanger without being mixed with each other and are heat-exchanged with each other. The compressor, the heat exchanger, and the expansion unit are interconnected by pipes so that the refrigerant circulates repeatedly therethrough.

However, the conventional water-cooled air conditioner has the following problems.

Since no mean for controlling air heat-exchanged in and discharged from the air conditioner is provided and no device for supplying external fresh air at necessary, it is difficult to make the pleasant indoor space.

Furthermore, since the refrigerant and the cooling water flow in an identical direction in one of cooling and heating modes of the conventional water-cooled air conditioner, the heat exchange efficiency is deteriorated.

SUMMARY OF THE INVENTION

Accordingly, the present invention is directed to a water-cooled air conditioning system that substantially obviates one or more problems due to limitations and disadvantages of the related art.

An object of the present invention is to provide a water-cooled air conditioning system than can control an amount of air discharged to an indoor space and an amount of air introduced from an outdoor side.

Another object of the present invention is to provide a water-cooled air conditioning system having a variety of devices that can allow for an effective operation thereof and increase the air conditioning efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a water-cooled air conditioning system including: an indoor unit having a first heat exchanger where air and refrigerant are heat-exchanged with each other; an outdoor unit having a second heat exchanger where water and the refrigerant are heat-exchanged with each other, the outdoor unit being formed at a side of the indoor unit; a cooling tower for cooling the water directed to the second heat exchanger, the cooling tower being connected to the outdoor unit; a discharge duct for guiding the air conditioned in the indoor unit to an indoor space for an air conditioning; and an intake duct for guiding the air in the indoor space to the indoor unit, the intake duct being provided at a side of the discharge duct, wherein the second heat exchanger is a plate type heat exchanger having a space that is divided by a plurality of thin plates spaced apart from each other by a predetermined distance into a plurality of sections along which the refrigerant and the cooling water separately flow.

In another aspect of the present invention, there is provided a water-cooled air conditioning system including: an indoor unit having a first heat exchanger where air and refrigerant are heat-exchanged with each other; an outdoor unit having a second heat exchanger where water and the refrigerant are heat-exchanged with each other, the outdoor unit being formed at a side of the indoor unit; a discharge duct for guiding the air conditioned in the indoor unit to an indoor space for an air conditioning; and an intake duct for guiding the air in the indoor space to the indoor unit, the intake duct being provided at a side of the discharge duct, wherein the second heat exchanger is a plate type heat exchanger having a space that is divided by a plurality of thin plates spaced apart from each other by a predetermined distance into a plurality of sections along which the refrigerant and the cooling water separately flow.

According to the above-defined water-cooled air conditioning system, the air conditioned in the indoor unit is directed to an indoor space through a discharge duct and the indoor air is guide to the indoor unit through an intake duct. A discharge damper is provided in the discharge duct to control an amount of the air discharged to the indoor space. Therefore, since the amount of the air discharged to the indoor space as necessary, the convenience in use can be improved.

The air conditioning system is further provided with an outdoor air inlet for directing the outdoor air to the indoor spacer and an outdoor air damper is installed in the outdoor air inlet to allow the outdoor air to be selectively introduced into the air conditioning system depending on a degree of freshness of the indoor air. Therefore, since the fresh outdoor air is conditioner and introduced into the indoor space as necessary, the pleasant environment can be realized.

In addition, the air conditioning system includes a directional control unit for allowing the water and the refrigerant to always flow in an opposite direction to each other, thereby further improving the heat exchange efficiency. As a result, the performance of the air conditioning system can be improved.

Furthermore, the air conditioning system further includes an over-cooler for further cooling the refrigerant cooled in the heat exchanger. The over-cooler includes a plurality of cooling pipes that are arranged in parallel or in series. Therefore, the performance of the air conditioning system can be improved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
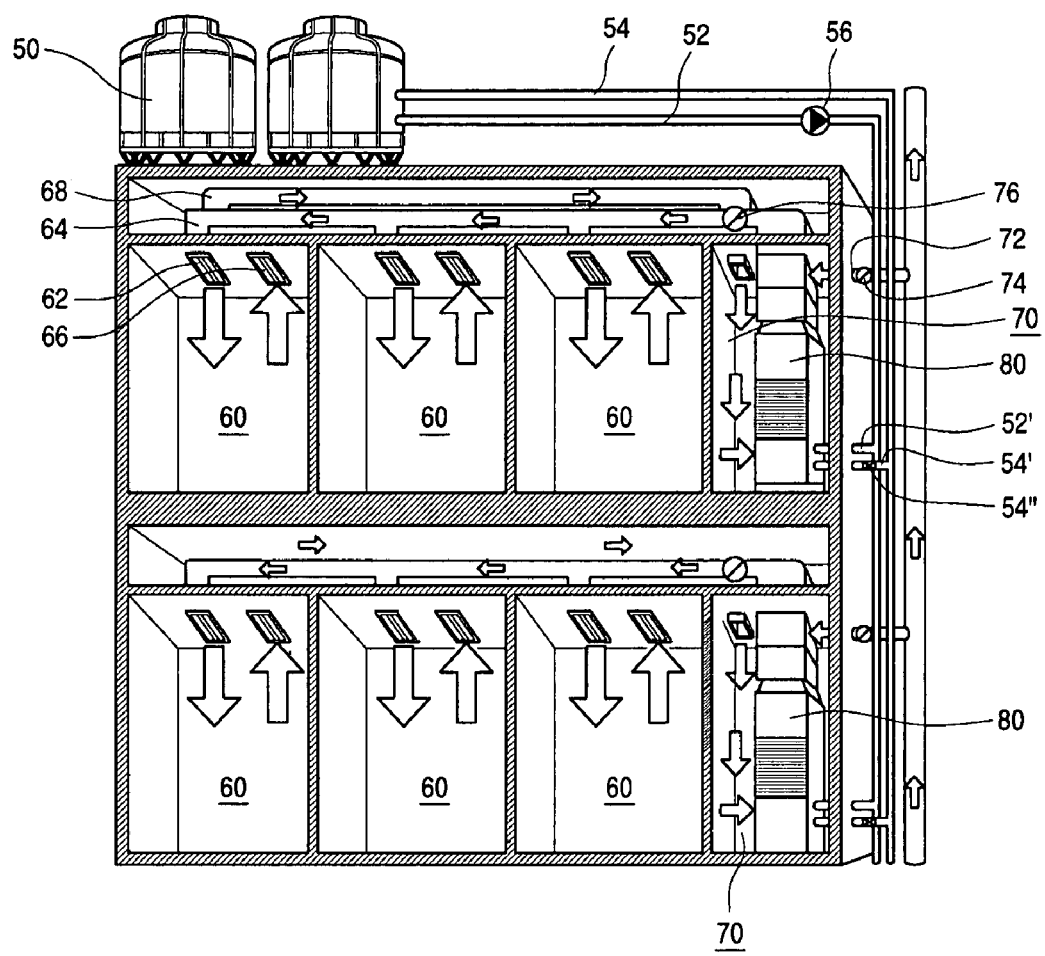
FIG. 1 is a view illustrating an installation state of a water-cooled air conditioning system according to an embodiment of the present invention installed in a building.
Figure 2:
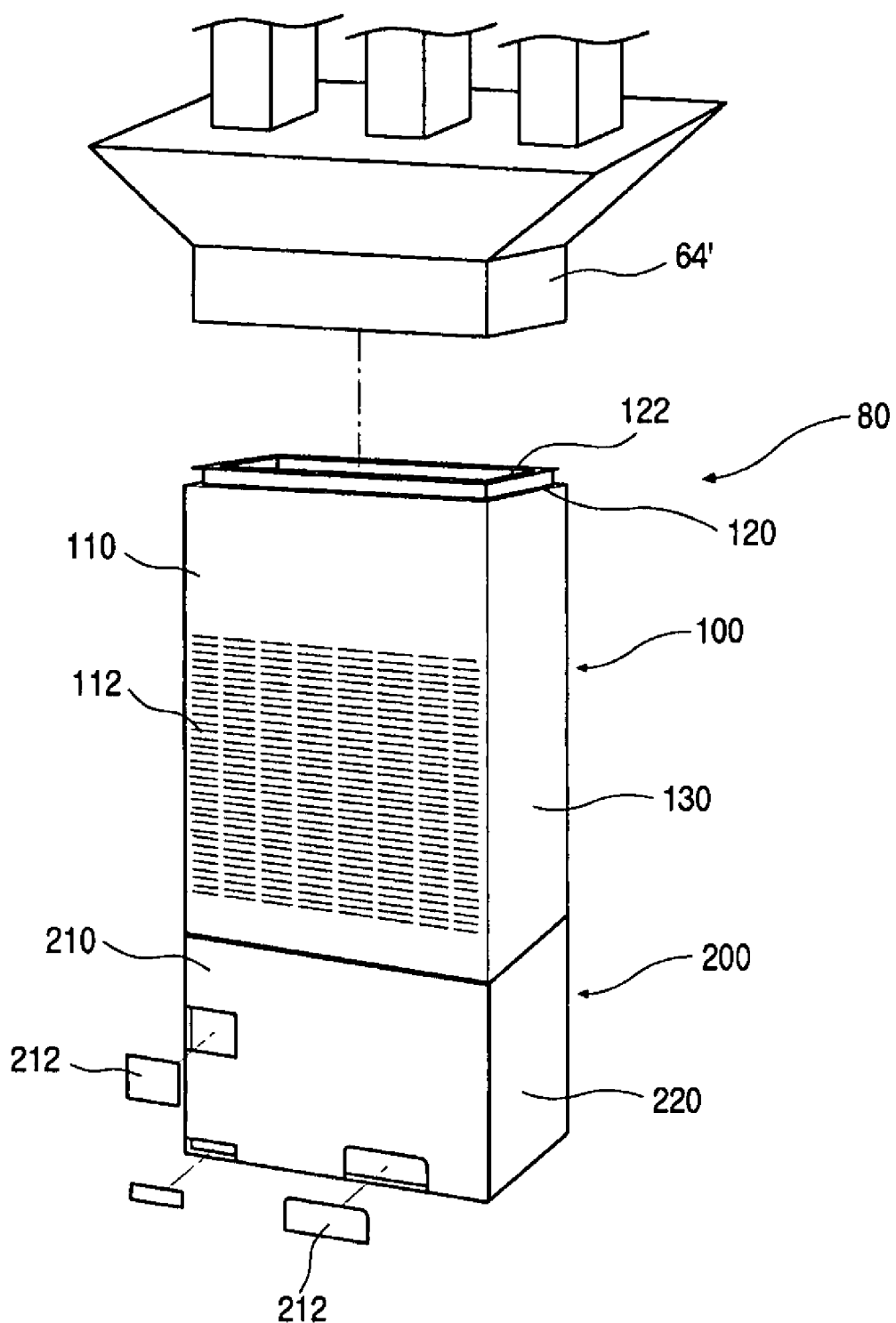
FIG. 2 is a perspective view of an air conditioner of the water-cooled air conditioning system of FIG. 1.

FIG. 1 is a view illustrating an installation state of a water-cooled air conditioning system according to an embodiment of the present invention is installed in a building, and FIG. 2 is a perspective view of an air conditioner of the water-cooled air conditioning system of FIG. 1.

A water-cooled air conditioning system will be briefly described with reference to FIG. 1. The water-cooled air conditioning system is generally applied to a large-scaled building or a high-rise building to condition the indoor air thereof. That is, the water-cooled air conditioning system is generally applied to a building having a plurality of separated indoor spaces.

For a multi-type water-cooled air conditioning system, indoor and outdoor units are separately installed. That is, the indoor units are installed in the respective indoor spaces to condition the air in the indoor spaces. At this point, the indoor and outdoor units are interconnected each other by refrigerant pipes. As the refrigerant flows between the indoor and outdoor units through the refrigerant pipes, the refrigerant is heat-exchanged with the indoor air to condition the indoor air.

For an integral type air conditioning system, the indoor and outdoor units are integrally structured. The integrally type air conditioning system is provided with an indoor outlet and an outdoor inlet to condition the indoor air. At this point, the indoor space is connected to the air conditioner by a duct. The conditioned air and the indoor air flow along the duct for the air conditioning of the indoor space.

FIG. 1 shows a water-cooled air conditioning system having the integral type air conditioner.

A cooling tower 50 is installed on a building top of a building to which the water-cooled air conditioning system is applied. The cooling tower 50 injects air with a high speed so that the water can directly contact the air. As the air directly contacts the water, the water is cooled.

That is, when the water contacts the cool air in the cooling tower 50, a portion of the water is vaporized. At this point, the cool air takes heat, which is required for the vaporization, from the water, thereby reducing the temperature of the water. Namely, the cooling tower 50 allows the water to flow an upside and a downside and the air is injected at the downside, thereby forming the cooling water.

A cooling water supply pipe 52 and a cooling water recovery pipe 54 are connected to the cooling tower 50 to guide the water (cooling water) coming in and out the cooling tower 50.

A plurality of indoor spaces 60 and an air conditioning room 70 in which mechanical components such as an air conditioner 80 are installed.

The cooling water generated in the cooling tower 50 is directed to the air conditioning room 70 along the water-cooling supply pipe 52. The cooling water supply pipe 52 is cylindrical having a predetermined diameter. The cooling water supply pipe 52 extends downward from the cooling tower 50 along an outer wall of the building.

The cooling water recovery pipe 54 for recovering the cooling water, which is heat-exchanged with the refrigerant in the air conditioner 80, to the cooling tower 50. The cooling water recovery pipe 54 is a cylindrical pipe extending to communicate with an upper half of the cooling tower 50.

Therefore, the cooling water generated in the cooling tower 50 is guided into the air conditioner 80 installed in the air conditioning room 70 along the cooling water supply pipe 52. The cooling water is heat-exchanged with the refrigerant in the air conditioner 80 and is then directed into the upper half of the cooling tower 50 along the cooling water recovery pipe 54. Then, the cooling water directed to the cooling tower 50 is cooled again and is then supplied to the air conditioner again. This process is repeated.

A cooling water pump 56 is installed in the cooling water supply pipe 52 so as to supply the cooling water generated in the cooling tower 50 having constant pressure to the air conditioner 80. When the cooling water having the constant pressure is supplied, the constant heat exchange efficiency can be realized when the cooling water is heat-exchanged with the refrigerant.

The cooling water supply and recovery pipes 52 and 54 are installed along the outer wall of the building and branched off into the air conditioning room 70 so as to direct the water to the air conditioner 80 or the cooling tower 50. That is, a cooling water supply branched pipe 52' and a cooling water recovery branched pipe 54' are respectively branched off from the cooling water supply pipe 52 and the cooling water recovery pipe 54 and penetrate the sidewall of the air conditioning room 70, thereby supplying or recovering the cooling water to or from the air conditioner.

As described above, the cooling water supply branched pipe 52' has a first end communicating with the cooling water supply pipe 52 and a second end extending into the air conditioner 80. The cooling water recovery branched pipe 54' has a first end communicating with the cooling water recovery pipe 54 and a second end extending into the air conditioner 80.

The cooling water recovery branched pipe 54' is provided with a cooling water recovery valve 54" to control the flow of the cooling water that is directed from the cooling tower 50 into the air conditioner 80, heat-exchanged with the refrigerant, and recovered through the cooling water recovery branched pipe 54'.

That is, when the air conditioner 80 operates, the cooling water recovery valve 54" is opened so that the cooling water heat-exchanged with the refrigerant in the air conditioner can be recovered into the cooling tower 50. When the air conditioner 80 does not operate, the cooling water recovery valve 54" is closed so that the cooling water is not recovered to the cooling tower 50.

The reason for closing the cooling water recovery valve 54" when the air conditioner does not operate is to allow the compressed refrigerant to be heat-exchanged with the cooling water during the initial operation of the air conditioner 80 and thus to prevent the high temperature refrigerant from being introduced into the compressor, thereby preventing the compressor from being damaged.

Meanwhile, an indoor discharge unit 62 is installed in each ceiling of the indoor spaces 60 of the building to discharge the air that is conditioned in the air conditioner 80 to the indoor spaces 60. The indoor discharge unit 62 installed at each of the indoor space 60 is designed to communicate with a first end of the discharge duct 64. A second end of the discharge duct 64 is designed to communicate with the air conditioner 80 so that the air conditioned in the air conditioner 80 is discharged into each indoor space 60 through the indoor discharge unit 62 installed at each indoor space 60 after being guided by the discharge duct 64.

In addition, an indoor sucking unit 66 is also installed in each ceiling of the indoor spaces 60 of the building in order to direct the indoor air into the air conditioner 80. The indoor sucking unit 66 communicates with the air conditioning room 70 by an intake duct 68.

That is, the indoor sucking unit 66 installed at each of the indoor space 60 communicates with a first end of the intake duct 68. A second end of the intake duct 68 is designed to communicate with the air conditioning room 70 so as to direct the indoor air to the air conditioning room 70 through the indoor sucking unit 66 installed at the indoor space 60 after being guided by the intake duct 68.

As described above, the air conditioner 80 installed in the air conditioning room 70 is connected to each of the indoor spaces 60 through the ducts 64 and 68, as a result of which the air can circulate the indoor spaces 60 and the air conditioning room 70. That is, as the air conditioned in the air conditioner 80 flows to the indoor spaces 60 through the discharge duct 64 for the air conditioning of the indoor spaces 60. The indoor air is introduced into the air conditioner 70 installed in the air conditioning room 70 through the intake duct 68. Accordingly, the air keeps circulating.

The air conditioning room 70 in which the air conditioner 80 is installed is formed at a side of the indoor spaces 60 in which the indoor discharge units 62 are installed. Outdoor air intake holes 72 are provided in an outer wall of the air conditioning room 70 to direct the fresh outdoor air into the air conditioning room 70.

The fresh outdoor air is introduced into the air conditioning room 70 through the outdoor air intake holes 72. The fresh outdoor air is introduced into the air conditioner 80 and is then discharged into the indoor space 60. As the fresh outdoor air is introduced into the indoor space 60, the indoor air is conditioned and ventilated.

An outdoor air damper 74 is installed in the outdoor air intake holes 72 so selectively open and close the outdoor air intake hole 72. That is, the outdoor air damper 74 opens and closes the outdoor air intake hole 72 to allow the outdoor air to be selectively introduced as necessary.

As described above, the fresh outdoor air is selectively introduced into the air conditioner by the outdoor air damper 74 depending on a user's need or a degree of freshness of air in the indoor space 60. If the outdoor air is continuously introduced, the load capacity of the air conditioner 80 increases. Therefore, the outdoor air damper 74 is provided to selectively open the outdoor air intake hole 72.

A discharge damper 76 is provided in the discharge duct 64 to discharge the air to the indoor space 60. The discharge damper 76 allows the conditioned air to be discharged into the indoor space 60 and allows the air that is not conditioned not to be discharged into the indoor space 60, thereby reducing the capacity of the air conditioner 80 and improving the convenience in use.

The integral type water-cooled air conditioner 80 is vertically installed in the air conditioning room 70.

The following will describe the air conditioner 80 with reference to FIG. 2.

The water-cooled air conditioner 80 is formed in a rectangular parallelepiped shape. The air conditioner 80 functions to condition the air in the indoor space 60 by sucking the indoor air directed into the air conditioning room 70 through the intake duct 68 using a plurality of components therein and discharge the conditioned air into the indoor space 60.

That is, the air conditioner 80 includes an indoor unit 100 in which the indoor air is introduced and conditioned and from which the conditioner air is discharged through the discharge duct 64 and an outdoor unit 200 that is provided under to the indoor unit 100 to direct the refrigerant heat-exchanged with the cooling water to the indoor unit 100.

The indoor unit 100 includes an indoor front panel 110 provided with a front intake hole 112 through which the indoor air is introduced, an indoor top panel 120 to which the discharge duct 64 is coupled, an indoor side panel 130, and an indoor rear panel (not shown).

The front intake hole 112 formed in the indoor front panel 110 is formed in a grille shape to direct the indoor air introduced into the air conditioning room 70 through the intake duct 68 into the indoor unit 100. By the front intake hole 112, relatively large-sized foreign objects contained in the air that is being introduced into the indoor unit 100 can be filtered off.

The indoor top panel 120 is provided with a chamber mounting unit 122 extending upward. A noise chamber 64' for reducing the nose at the discharge duct 64 is mounted on the chamber mounting unit 64'. The air conditioned in the indoor unit 100 is discharged to the indoor space 60 through the noise chamber 64'.

The outdoor unit 200 is formed under the indoor unit 100. The outdoor unit 200 includes an outdoor front panel 210 for defining a front appearance, a rear panel (220 of FIG. 4) for defining a rear appearance, an outdoor side panel 230 defining a side appearance, and a base pan (240 of FIG. 4) defining a bottom appearance and supporting a plurality of components thereon.

A plurality of service panels 212 are detachably mounted on the outdoor front panel 210. By the service panels 212, the maintenance of the components installed in the outdoor unit 200 can be effectively performed without detaching the outdoor front panel 210.

Figure 3:
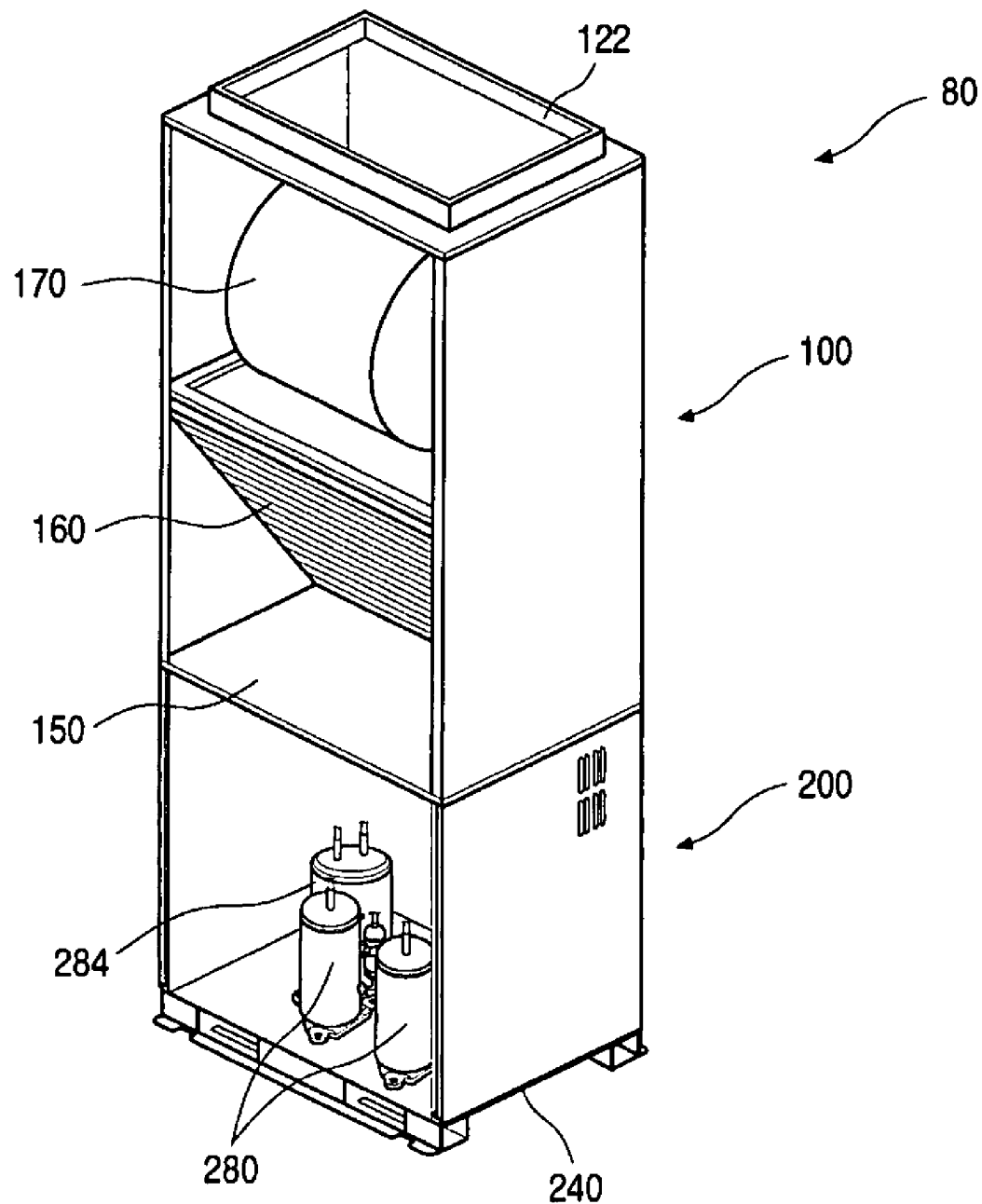
FIG. 3 a schematic perspective view an internal structure of the air conditioner of FIG. 2.

FIG. 3 is an exploded perspective view of an internal structure of the water-cooled air conditioner 80. Referring to FIG. 3, an internal space of the air conditioner 80 is divided into an upper-half space and a lower-half space by a dividing plate 150.

The dividing plate 150 is formed in a rectangular shape. A space defined above the dividing plate 150 becomes the upper-half space and a space defined below the dividing plate 150 becomes the lower-half space.

A first heat exchanger 160 where the refrigerant is heat-exchanged with the indoor air is mounted to be inclined in the lower-half space (i.e., a space in rear of the front intake hole 112) of the indoor unit 100 and a blower unit 170 for generating and guiding an air current is installed above the first heat exchanger 160.

The first heat exchanger 160 is formed of a cylindrical pipe that is bent at a plurality of locations and a plurality of cooling fins are perpendicularly formed around the pipe. Therefore, an overall shape of the first heat exchanger 160 is rectangular having a predetermined thickness. The first heat exchanger 160 is inclined downward as it goes rearward. That is, when viewed from a right side, the first heat exchanger 160 is formed in a "\" shape. That is, an upper end of the first heat exchanger 160 is mounted on a top-rear side of the front intake hole 112 and a lower end of the first heat exchanger 160 is mounted on a top rear end of the dividing plate 150.

The blower unit 170 directs the air, which is heat-exchanged while passing through the first heat exchanger 160, to the discharge duct 64. The conditioned air is discharged to a target space to be air-conditioned through the discharge dust 64.

The blower unit 170 includes a fan motor (not shown) that generates rotational power by receiving an external electric power, a flow fan (not shown) that rotates by the fan motor (not shown), and a fan housing (not shown) that encloses the blower fan (not shown) to guide the air generated by the rotation of the blower fan.

The fan motor is a direct driver (DD) motor that can be directly connected to the flow fan. When the DD motor is used as the fan motor, the noise is relatively low and it is not frequently out of order.

A sirocco fan is generally used as the blower fan. The sirocco fan is provided with a plurality of fan blades mounted along an outer circumference. Therefore, the air is sucked from left and right sides and discharged outward. The air discharged by the blower fan (not shown) is discharged upward by being guided by the fan housing (not shown).

The fan housing (not shown) is provided at both side surfaces with openings through which the air discharged from the first heat exchanger 160 is introduced by the rotation of the blower fan (not shown). The fan housing (not shown) is further provided at a top with an opening through which the introduced air is discharged upward. The air discharged through the top of The fan housing (not shown) passes through the noise chamber 64' so that the noise is reduced and then discharged to the discharge duct 64.

The following will describe the outdoor unit with reference to the accompanying drawings.

Figure 4:
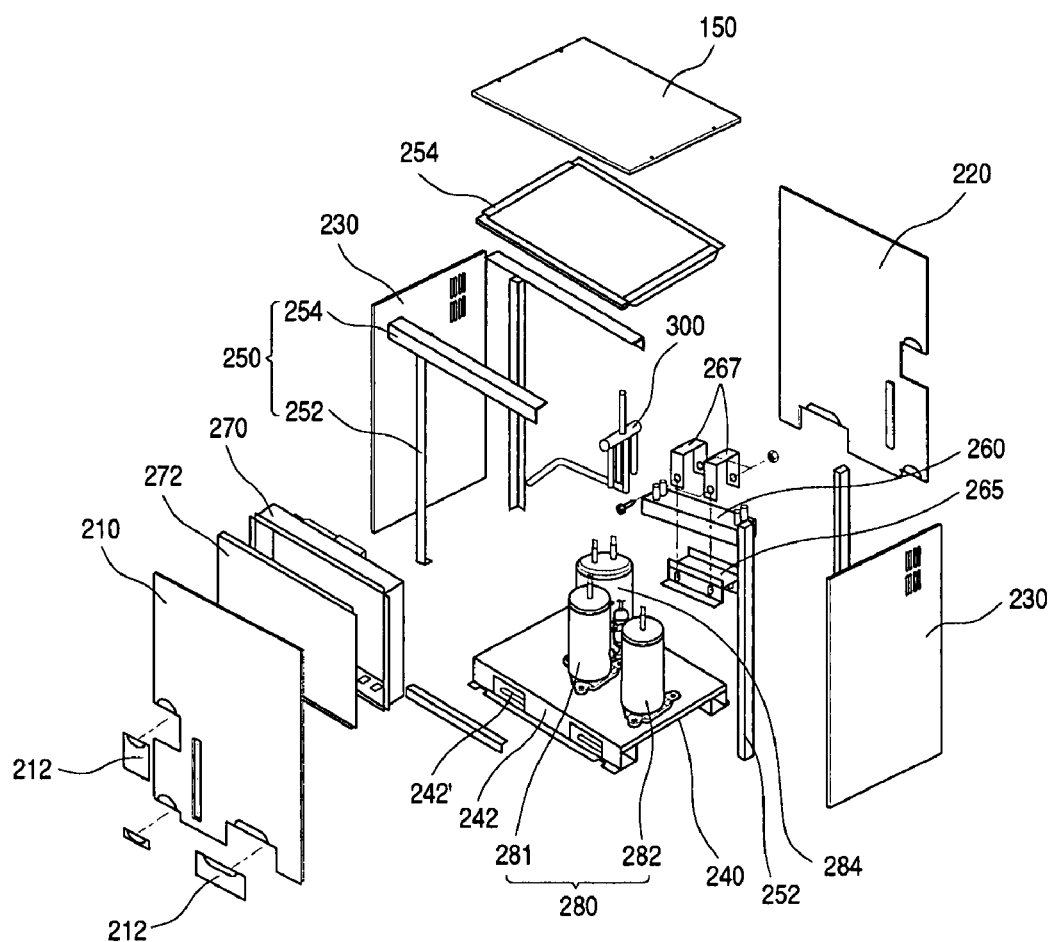
FIG. 4 is an exploded perspective view of an outdoor unit of the air conditioner of FIG. 2.
Figure 5:
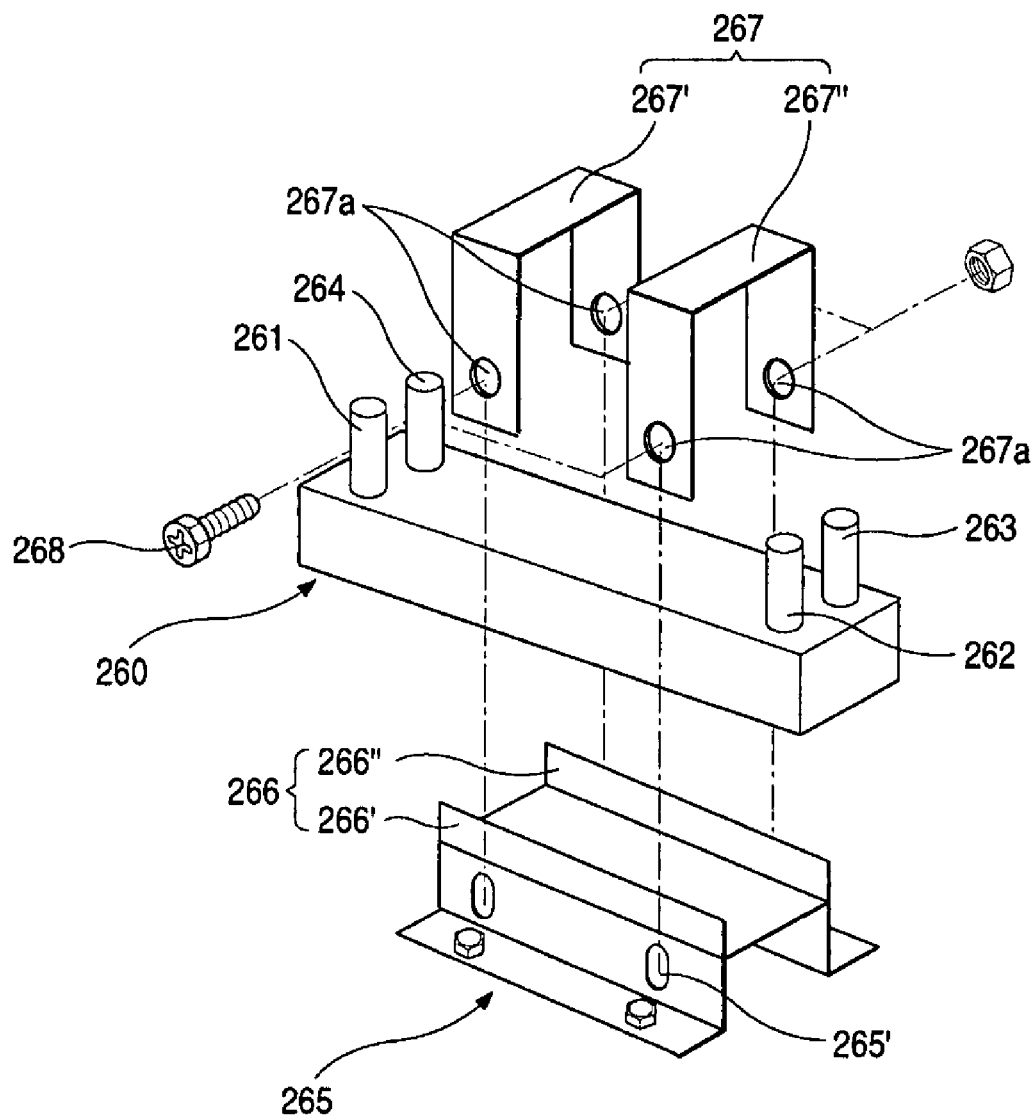
FIG. 5 is an exploded perspective view of an installation state of a heat exchanger of the air conditioner of FIG. 2.

FIG. 4 is an exploded perspective view of the outdoor unit of the air conditioner, and FIG. 5 is an exploded perspective view of an installation state of the heat exchanger of the air conditioner.

Referring to FIG. 4, the outdoor front panel 210 and the outdoor rear panel 220 that respectively define the front and rear outer appearances of the outdoor unit 200 are identical in a shape and opposite to each other. The outdoor left side panel and the outdoor right side panel are identical in a shape and opposite to each other.

As described above, as the outdoor front panel 210 and the outdoor rear panel 220 are formed in an identical shape and the outdoor left panel and the outdoor right panel are also formed in an identical shape, the manufacturing process thereof is simplified and the assembling capability can be improved.

The base pan 240 is formed of a rectangular plate having a predetermined thickness. A base support 242 formed in a rectangular box shape supports front and rear ends of the base pan 240. The base support 242 is provided with a pork hole 242' through which a pork of a forklift can pass. The bottom of the bottom surface of the base 216 is spaced apart from a floor by the base support 242, thereby making it easy to move, carry and install the air conditioner.

Each of the panels defining the appearance of the outdoor unit 200 is coupled to and supported by frames 250. The frames 250 include vertical frames 252 mounted on top corners of the base pan 240 and extending upward and horizontal frames 254 coupled to upper ends of the vertical frames 252.

Each of the vertical frames 252 has a predetermined thickness and is bent perpendicularly to define an outer surface. The panels are mounted on the outer surfaces of the vertical frames 252 to define an inner space of the outdoor unit 200.

The horizontal frames 254 are coupled to the upper ends of the vertical frames 252. Each of the horizontal frames 254 has a predetermined thickness and is bent downward.

A control box 270 is mounted in rear of an upper-half of a rear surface of the outdoor front panel 210. The control box 270 is formed in a rectangular box shape having a predetermined space. The control box 270 has an opened front surface. The opened front surface is selectively opened and closed by a control box cover 272 formed of a rectangular plate. A plurality of electronic components are mounted inside the control box 270 to control the operation of the water-cooled air conditioning system.

A plurality of compressors 280 are mounted in rear of the control box 270. Each of the compressors 280 is formed in a cylindrical shape having a predetermined diameter. The compressors 280 functions to compress the refrigerant to a high temperature/pressure state. A scroll compressor whose noise is relatively low is generally used as the compressor.

The compressors 280 include a constant speed compressor 281 operating with a constant speed and an inverter compressor 282 that is a variable speed heat pump. The constant speed compressor 281 operates with the constant speed regardless of the load capacity and the inverter compressor 282 controls its RPM to variably operate.

When a temperature difference between the indoor space 60 and the outdoor space is relatively low or an area of the indoor space 60 is relatively small, the load capacity is relatively low. In this case, the inverter compressor 282 operates first. Then, as the load capacity gradually increases and thus the inverter compressor 282 is unequal to the increased load capacity, the constant speed compressor 281 together with the inverter compressor 282 operates.

An accumulator 284 is mounted in rear of the compressor 280. The accumulator 284 filters off liquid-phase refrigerant so than only the gas-phase refrigerant can be introduced into the compressors 280.

If the liquid-phase refrigerant that is directed from the indoor unit 100 and is not vaporized is directly introduced into the compressor 280, the compressor 280 for compressing the refrigerant to a high temperature/pressure gas-phase state may be overloaded and thus damaged.

Therefore, since the liquid-phase refrigerant that is introduced into the accumulator and is not vaporized is relatively heavier than the gas-phase refrigerant, the liquid-phase refrigerant is settled down at a lower portion of the accumulator 284 and only the gas-phase refrigerant is introduced into the compressor 280.

A second heat exchanger 260 where the refrigerant and the cooling water are heat-exchanged with each other is mounted on a top rear end of the base pan 240. The second heat exchanger 260 is formed in a rectangular box shape has a length in a horizontal direction.

The second heat exchanger 260 is a plate type heat exchanger. A plurality of thin plates are spaced apart from each other and arranged in the second heat exchanger 260. The refrigerant and cooling water are heat-exchanged with each other while flowing along the spaces defined between the thin plates.

Describing in more detail, a plurality of layers are formed in the second heat exchanger 260 by the thin plates. When the thin plates are referred as first, second, third ... and Nth thin plates from the top, the refrigerant flows along a space defined between the first and second thin plates and the cooling water flows along a space defined between the second and third plates. In addition, the refrigerant flows along a space defined between the third and fourth plates and the cooling water flows along a space defined between the fourth and fifth plates. That is, the refrigerant and cooling water alternately flow along the spaces defined between the thin plates, in the course of which the heat exchange between the refrigerant and cooling water is realized.

The second heat exchanger 260 is fixed on the top of the base pan 240 by mounting and fixing brackets 265 and 267. The mounting bracket 265 is formed of a rectangular plate having a predetermined thickness and a length in a horizontal direction. A central portion of the mounting bracket 265 is elevated upward. A front end of the mounting bracket 265 is bent frontward and a rear end of the mounting bracket 265 is bent rearward. A bottom surface of the front and rear ends are coupled to the base pan 240 while contacting a top surface of the base pan 240.

Describing the mounting state of the second heat exchanger 260 in more detail with reference to FIG. 5, a left refrigerant inflow/outflow portion 261 is formed on a top left end of the second heat exchanger 260. The left refrigerant inflow/outflow portion 261 is formed of a cylindrical pipe having a predetermined diameter and extends upward. A lower end of the left refrigerant inflow/outflow portion 261 contacts a top of the second heat exchanger 260.

A right refrigerant inflow/outflow portion 262 is formed on a top right end of the second heat exchanger 260. The refrigerant introduced through the left refrigerant inflow/outflow portion 261 is heat-exchanged with the cooling water while passing through the second heat exchanger 260 and discharged out of the second heat exchanger 260 through the right refrigerant inflow/outflow portion 262. The right refrigerant inflow/outflow portion 262 is formed of a cylindrical pipe having a predetermined diameter and extends upward. A lower end of the right refrigerant inflow/outflow portion 262 contacts the top of the second heat exchanger 260.

A right water inflow/outflow portion 263 through which the cooling water generated in the cooling tower 50 is supplied into the second heat exchanger 260 is formed in rear of the right refrigerant inflow/outflow portion 262 while extending upward. The right water inflow/outflow portion 263 is formed of a cylindrical pipe having a predetermined diameter. A lower end of the right water refrigerant inflow/outflow portion 263 contacts a top of the second heat exchanger 260.

A left water inflow/outflow portion 264 is formed in rear of the left refrigerant inflow/outflow portion 261. The cooling water introduced through the right water inflow/outflow portion 263 is heat-exchanged with the refrigerant while passing through the second heat exchanger 260 and discharged out of the second heat exchanger 260 through the left water inflow/outflow portion 264. The left water inflow/outflow portion 264 is formed of a cylindrical pipe having a predetermined diameter and extends upward. A lower end of the left water inflow/outflow portion 264 contacts the top of the second heat exchanger 260.

The right water inflow/outflow portion 263 is connected to the cooling water supply branched pipe 52' so as to function as a passage through which the cooling water generated in the cooling tower 50 is directed into the second heat exchanger 260 through the cooling water supply pipe 52 and the cooling water supply branched pipe 52'. The left water inflow/outflow pipe 264 is connected to the cooling water recovery branched pipe 54' so as to function as a passage through which the cooling water, which is heat-exchanged with the refrigerant in the second heat exchanger 260, is recovered to the cooling tower 50 through the cooling water recovery branched pipe 54' and the cooling water recovery pipe 54.

As described above, the refrigerant flows rightward in the second heat exchanger 260 while the cooling water flows leftward, in the course of which the cooling water and the refrigerant are heat-exchanged with each other.

As described above, the second heat exchanger 260 is mounted on the base pan 240. That is, the second heat exchanger 260 is supported on the base pan 240 while having a bottom surface contacting the top surface of the mounting bracket 265. The bottom surfaces of the front and rear ends of the mounting bracket 265 are coupled to the top of the base pan 240 by screws. At this point, a shock absorbing member (not shown) may be interposed between the mounting bracket 265 and the base pan 240 to prevent vibration generated from the compressor 280 from being transmitted to the second heat exchanger 260 and prevent vibration generated from the second heat exchanger 260 from being transmitted to the base pan 240.

A plurality of bracket coupling holes 265' in which fixing members 268 are coupled to fix the fixing bracket 267 are front and rear surfaces of a central portion of the mounting bracket 265. The bracket coupling holes 265' are formed at left and right sides with reference to a central line of each of the front and rear surfaces of the central portion of the mounting bracket 265. Each of the bracket coupling holes 265' is formed in an oval shape having a longer diameter in a vertical direction.

By forming the bracket coupling holes 265' as described above, there is no need to change the mounting bracket 265 in accordance with an installation height of the second heat exchanger 260. That is, when the second heat exchanger 260 having a relatively high installation location is installed on the mounting bracket 265, the lower end of the fixing bracket 267 is coupled in a state where it is ascended by a predetermined height. At this point, the fixing members 268 penetrate upper ends of the bracket coupling holes 265' to fix the second heat exchanger 260 on the mounting bracket 265.

On this other hand, when the second heat exchanger 260 having a relatively low installation location is installed on the mounting bracket 265, the fixing members 268 penetrate lower ends of the bracket coupling holes 265' to fix the second heat exchanger 260 on the mounting bracket 265.

As described above, even when the installation height of the second heat exchanger 260 varies, the coupling location of each fixing member 268 can vary within a range of the vertical length of each bracket coupling hole 265'. Therefore, there is no need to change the mounting bracket 265.

A mounting guide 266 is formed on a top surface of the mounting bracket 265. The mounting guide 266 includes a front guide 266' extending upward from a top front end of the mounting bracket 265 and a rear guide 266" extending upward from a top rear end of the mounting bracket 265.

The front guide 266' is formed of a rectangular plate and has a lower end contacting the top front end of the mounting bracket 265. The front guide 266' may integrally extend from the top front end of the mounting bracket 256.

The rear guide 266" is formed of a rectangular plate corresponding to the front guide 266'.

The second heat exchanger 260 is disposed between the front and rear guides 266' and 266" while front and rear surfaces contact the front and rear guides 266' and 266", respectively. That is, the front and rear guides 266' and 266" function to accurately guide the installation of the second heat exchanger 260.

A height of the mounting guide 266 is lower than that of the second heat exchanger 260 so that the second heat exchanger 260 can be fixed by fixing the fixing bracket 267 on the mounting bracket 265. That is, if the higher of the mounting guide 266 is greater than that of the second heat exchanger 260, a size of the space defined between the fixing bracket 267 and the mounting bracket 265 is greater than the height of the second heat exchanger 260 even when the fixing bracket 267 is coupled to the mounting bracket 265 after the second heat exchanger 260 is disposed on the top surface of the mounting bracket 265 and thus the second heat exchanger 260 cannot be stably fixed.

The fixing bracket 267 is formed of a rectangular plate having a relatively small width and a predetermined thickness. Front and rear ends of the fixing bracket 267 are bent downward so as to have a "Π" shape when viewed from a side direction.

The fixing bracket 267 is divided into a left fixing bracket 267' and a right fixing bracket 267" with reference to a to central portion of the second heat exchanger 260. The left fixing bracket 267' is for fixing the top central left portion of the second heat exchanger 260 and the right fixing bracket 267" is for fixing the top central right portion of the second heat exchanger 260.

The fixing bracket 267 is provided at lower ends of the front and rear surfaces with fixing bracket coupling holes 267a through which fixing members 268 are coupled to the mounting bracket 265. As the fixing members 268 penetrate the fixing bracket coupling holes 267a, the fixing bracket 267 is fixed on the mounting bracket 265.

As the fixing members 268, a variety of coupling members may be used. In the present embodiment, screws are applied.

When the second heat exchanger 260 is disposed on the top surface of the mounting bracket 265 while being guided by the mounting guide 266, a bottom surface of the second heat exchanger 260 contacts the top surface of the mounting bracket 265 and thus the second heat exchanger 260 is supported by the mounting bracket 265.

When the second heat exchanger 260 seats on a central top of the mounting bracket 265, the fixing bracket 267 supporting an upper half of the second heat exchanger 260 is coupled to the front and rear surfaces of the mounting bracket 265.

At this point, the fixing members 268 penetrate the fixing bracket coupling holes 267a and further penetrate the bracket coupling holes 265' formed in the front and rear surface of the mounting bracket 265, after which nuts are coupled to the fixing members 268 so that the fixing bracket 267 is securely coupled to the mounting bracket 265.

Figure 6:
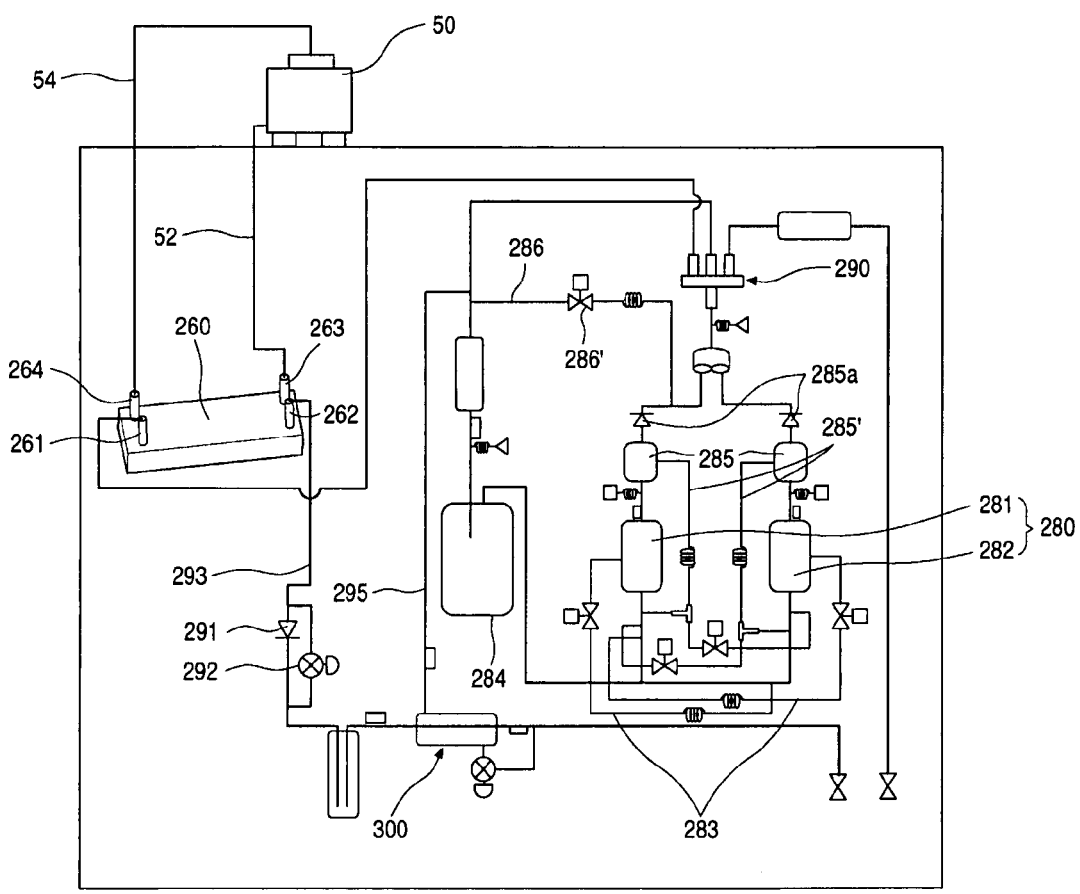
FIG. 6 is a circuit diagram of an outdoor unit of the air conditioner of FIG. 2.

The following will describe an internal structure of the outdoor unit 200 with reference to FIG. 6.

An oil regulating pipe 283 is communicably formed between the constant speed compressor 281 and the inverter compressor 282. When one of the compressors 281 and 282 is short of oil, the oil is supplied from the other of the compressors 281 and 282 to the compressor that is short of the oil through the oil regulating pipe 282, thereby preventing the compressor 280 from being damaged.

An oil separator 285 for filtering off oil contained in the refrigerant discharged from the compressor 280 and returning the filtered oil to the compressor 280 is provided at an outlet of the compressor 280.

That is, a portion of the oil used for removing frictional heat generated during the operation of the compressor 280 and efficiently driving the compressor 280 is mixed with the refrigerant compressed in the compressor 280 and discharged out of the compressor 280. Therefore, the oil mixed with the refrigerant and discharged out of the compressor 280 is separated by the oil separator 285 and returned to the compressor 280 through the oil recovery pipe 285'.

An oil separator check valve 285a is provided at an outlet of the oil separator 285 to prevent the refrigerant from flowing back. When only one of the compressors 281 and 282 operates, the oil separator check valve 285a, the oil separator check valve 285*a* prevents the refrigerant from flowing toward the other of the compressors 281 and 282.

The oil separator 285 communicates with a refrigerant control valve 290 by a pipe. A four-way valve is used as the refrigerant control valve 290 to convert the flow direction of the refrigerant in accordance with an operation mode of the air conditioning system. Ports of the refrigerant control valve 290 respectively communicate with an oil separator 285, the first heat exchanger 160, the second heat exchanger 260, and the accumulator 284.

A hot gas pipe 286 for allowing a portion of the refrigerant flowing from the oil separator toward the refrigerant control valve 290 to be directly directed into the accumulator 284 is further provided.

The hot gas pipe 286 is provided to directly supply the high pressure refrigerant discharged from the compressor 280 to the accumulator 284 where there is a need to increase pressure of the low pressure refrigerant that is being introduced into the accumulator 284. A hot gas valve 286' is installed in the hot gas pipe 286 to selectively block the hot gas pipe 286.

An outdoor electronic valve 292 for selectively opening and closing a refrigerant pipe 293 connecting the left refrigerant inflow/outflow portion 263 to the first heat exchanger 160 is mounted in the refrigerant pipe 293. An outdoor check valve 291 is mounted at a side of the outdoor electronic valve 292.

An over cooler 300 is provided in the refrigerant pipe 293 connecting the outdoor electronic valve 292, the outdoor check valve 291, and the first heat exchanger 160 to each other. The over-cooler 300 is formed in a dual pipe structure. Therefore, a portion of the refrigerant flowing along the refrigerant pipe 293 is branched off to flow back at the over-cooler 300 and is heat-exchanged with the refrigerant flowing along the refrigerant pipe 293. The heat-exchanged branched refrigerant is guided to the accumulator 284 through the over-cooler recovery pipe 295.

The over-cooler 300 may be formed with a plurality of over-cooling pipes.

Figure 7:
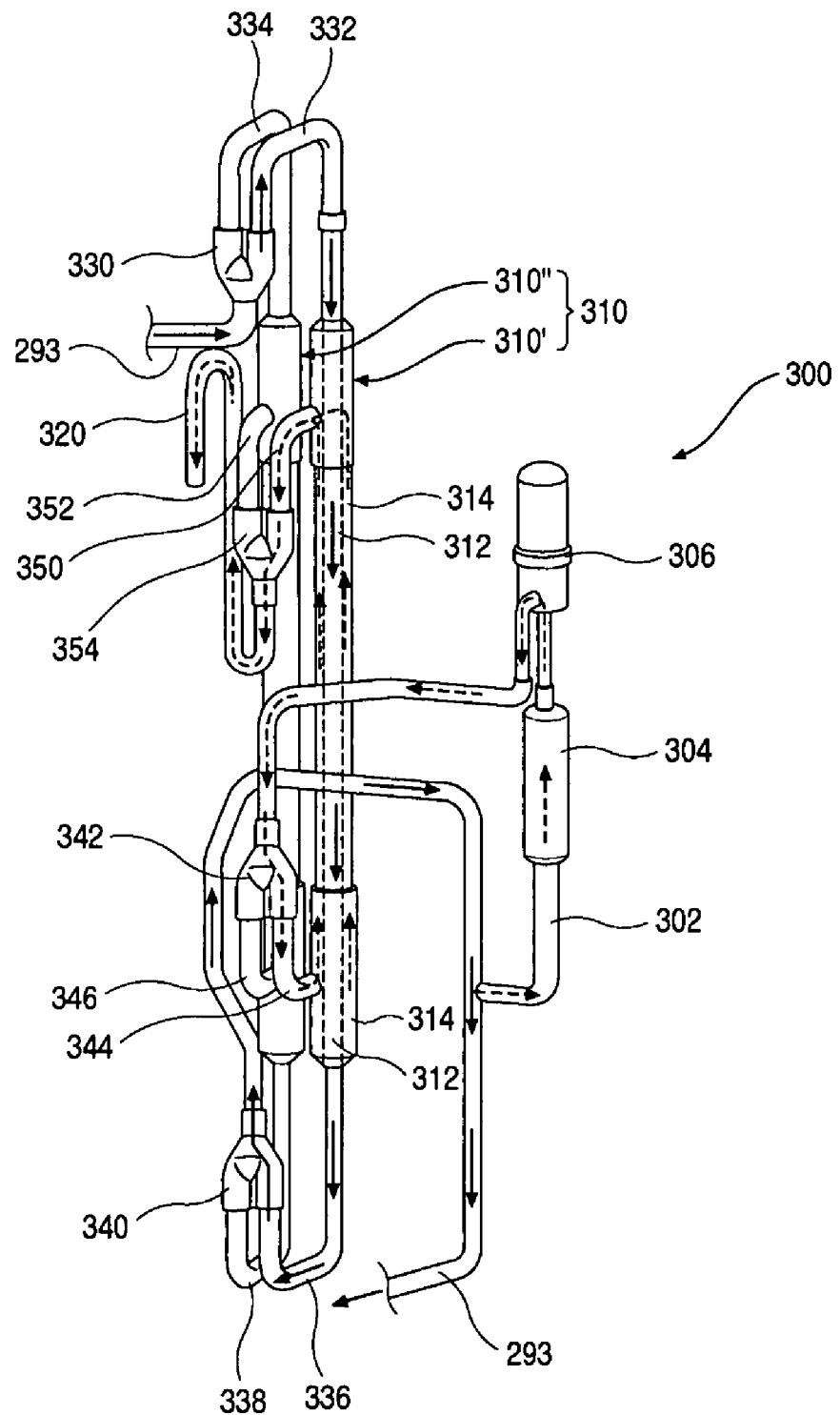
FIG. 7 is a perspective view of an over-cooler of the air conditioner of FIG. 2.

FIG. 7 is a perspective view of the over-cooler that is installed in parallel in the outdoor unit of the air conditioner.

Referring to FIG. 7, the over-cooler 300 is designed to be branched off from the refrigerant pipe 293. The over-cooler 300 includes a reverse transfer pipe 302 for guiding a portion of the refrigerant flowing along the refrigerant pipe 293, an expansion portion 304 that is mounted in the reverse transfer pipe to expand the refrigerant flowing along the reverse transfer pipe 302, an over-cooling valve 306 that is mounted in the reverse transfer pipe to control the flow of the refrigerant expanded through the expansion portion 304, a plurality of over-cooling pipes 310 where the refrigerant passing through the over-cooling valve 306 is heat-exchanged with the refrigerant flowing along the refrigerant pipe 203, and an over-cooler recovering pipe 320 for guiding the refrigerant, which is heat-exchanged while flowing along the over-cooling pipes 310, to the accumulator 284.

An overall shape of the over-cooler 300 is formed in a straight type in a vertical direction. Therefore, the refrigerant flowing along the reverse transfer pipe 302 passes through the over-cooling pipes 310 that are formed in a cylindrical pipe shape having a length in the vertical direction, thereby allowing the refrigerant to be heat-exchanged.

In more detail, the refrigerant pipe 293 communicating with the second heat exchanger 260 is bent upward (see FIG. 7). A dispensing unit 330 is branched off from the refrigerant pipe 293. The dispensing unit 330 is branched off in a Y-shape to allow the refrigerant flowing along the refrigerant pipe 293 is dispensed in two directions.

Therefore, first and second refrigerant inflow pipes 332 and 334 are respectively connected to branched pipes of the dispensing unit 330. Therefore, the refrigerant (main refrigerant) flowing along the refrigerant pipe 293 is guided by the first and second refrigerant inflow pipes 332 and 334.

Although not shown in the drawings, a refrigerant control valves may be provided in the dispensing unit 330 to control an amount of the refrigerant flowing along the first and second refrigerant inflow pipes 332 and 334.

The first and second refrigerant inflow pipes 332 and 334 are connected to upper ends of the over-cooling pipes 310. That is, the over-cooling pipes 310 include first and second over-cooling pipes 310' and 310". The first and second refrigerant inflow pipes 332 and 334 are respectively connected to upper ends of the first and second over-cooling pipes 310' and 310".

First and second refrigerant outflow pipes 336 and 338 are respectively connected to lower ends of the first and second over-cooling pipes 310' and 310". That is, the first and second over-cooling pipes 310' and 310" are respectively arranged between the first refrigerant inflow pipe 332 and the first refrigerant outflow pipe 336 and between the second refrigerant inflow pipe 334 and the second refrigerant outflow pipe 338.

The first and second refrigerant outflow pipes 336 connected to the respective over-cooling pipes 310 are bent in a U-shape. The first and second refrigerant outflow pipes 336 and 338 merge with each other at a common pipe 340. As shown in the drawing, the common pipe 340 is formed in a shape symmetrical to the dispensing unit 330 so that the refrigerants flowing along the divided pipes can merge with each other therein. An upper end of the common pipe 340 is connected to the refrigerant pipe 293. The refrigerant pipe 293 is bent rightward and further bent downward (see FIG. 7). The refrigerant pipe 293 bent downward is further bent frontward.

The reverse transfer pipe 32 is branched off rightward from the refrigerant pipe 293 extending downward and is then bent upward. The reverse transfer pipe 302 bent upward is further bent downward to be formed in a "∩" shape.

The reverse transfer pipe 302 bent downward is further bent leftward and is then further bent downward. The reverse transfer pipe 302 bent downward is connected to a reverse dispensing unit 342.

The reverse dispensing unit 342 is formed to correspond to the dispensing unit 330. The function of the reverse dispensing unit 342 is similar to that of the dispensing unit 330. That is, the reverse dispensing unit 342 dispenses the reverse refrigerant (branched refrigerant) flowing along the reverse transfer pipe 302 in two directions.

First and second reverse transfer pipes 344 and 346 are respectively connected to lower ends of divided pipes of the reverse dispensing unit 342. The first and second reverse transfer pipes 344 and 346 are connected to lower end portions of the first and second over-cooling pipes 310' and 210". The lower ends of the first and second transfer pipes 344 and 346 are respectively connected to lower ends of outer pipes 314 of the over-cooling pipes 310.

An over-cooling recovery pipe 320 for guiding the refrigerant, which is introduced through the reverse transfer pipes 302 and discharged from the over-cooling pipes 310, is connected to upper-halves of the outer circumferences of the over-cooling pipes 310. The over-cooling recovery pipe 320 is connected to an inlet of the accumulator 284.

In more detail, first and second recovery pipes 350 and 352 are respectively formed near upper ends of the over-cooling pipes 310. That is, the first recovery pipe 350 is formed in a "⌐" shape near the upper end of the first over-cooling pipe 310' and the second recovery pipe 352 is formed in a "⌐" shape near the upper end of the second over-cooling pipe 310" (see FIG. 7).

A reverse common pipe 354 is formed on lower ends of the first and second recovery pipes 350 and 352 so as to merge the refrigerant flowing along the first and second recovery pipes 250 and 252 with each other and to direct the refrigerant to the over-cooling recovery pipe 320.

Describing the reverse transfer pipe 302 in more detail, the reverse transfer pipe 302 is coupled to a lower end of the over-cooling pipe 584 and bent many times. The reverse transfer pipe 302 is branched off rightward from a portion of the outer circumference of the refrigerant pipe 293 bent downward (see FIG. 7).

The reverse transfer pipe 302 is further bent upward. The expansion portion 304 is installed at the reverse transfer pipe 302 bent upward. The expansion portion 304 is formed in a cylindrical shape having a predetermined diameter. A sectional area of the expansion portion 304 is greater than that of the reverse transfer pipe 302.

The reverse transfer pipe 302 defining an upper portion of the expansion portion 304 is provided with an over-cooling valve 306. The reverse transfer pipe 302 is bent downward after passing through the over-cooling valve 306 and is further bent leftward (see FIG. 7).

The reverse transfer pipe 302 bent leftward is again bent downward and is connected to the reverse dispensing unit 342.

The over-cooling recovery pipe 320 connected to the lower end of the reverse common pipe 354 extends downward and is then bent in a "U" shape to extend upward. The over-cooling recovery pipe 320 is bent downward in a "∩" shape. The over-cooling recovery pipe 320 bent downward is further bent many times and then connected to an inlet side pipe of the accumulator 284.

The expansion portion 304 is mounted on the reverse transfer pipe 302 to expand the refrigerant (branch refrigerant) flowing along the reverse transfer pipe 302. That is, a diameter of the expansion portion 304 is greater than that of the reverse expansion pipe 302 to insulation-expand the refrigerant (branch refrigerant) flowing along the reverser transfer pipe 302.

That is, when the refrigerant (branch refrigerant) flowing along the reverse transfer pipe 302 is directed to a large space, it is expanded to increase the volume, thereby realizing the insulation-expansion where no heat-exchange with outer air occurs.

By the insulation-expansion, the temperature of the refrigerant is lowered and thus the refrigerant flowing along the reverse transfer pipe 302 is further cooled while passing through the expansion portion 304.

The refrigerant (branch refrigerant) that is over-cooled while passing through the expansion portion 304 is directed to the over-cooling valve 306 by which the flow of the over-cooled refrigerant is controlled. The refrigerant (branch refrigerant) passing through the over-cooling valve 306 is introduced into the over-cooling pipes 310 along the reverse transfer pipe 302.

Each of the over-cooling pipes 310 is formed in a dual-pipe structure and extends straightly in a vertical direction. That is, each of the over-cooling pipes 310 includes an inner pipe 312 and an outer pipe 314 enclosing the outer circumference of the inner pipe.

The inner pipes 312 are formed between the first refrigerant inflow pipe 332 and the first refrigerant outflow pipe 336 and between the second refrigerant inflow pipe 334 and the second refrigerant outflow pipe 338, respectively. Diameters of the inner pipes 312 are identical to those of the first refrigerant inflow and outflow pipes 332 and 336, respectively. The inner pipes 312 are formed of a material having a high thermal conductivity. That is, the inner pipes 312 are formed of metal so that the heat of the refrigerant flowing along the inner pipes 312 can be effectively transmitted to the refrigerant flowing along the outer side thereof.

A diameter of the outer pipe 314 is greater than that of the inner pipe 312 to enclose the inner pipe 312. The outer pipes are formed between the first reverser transfer pipe 344 and the first recovery pipe 350 and between the second reverse transfer pipe 346 and the second recovery pipe 352, respectively.

Figure 8:
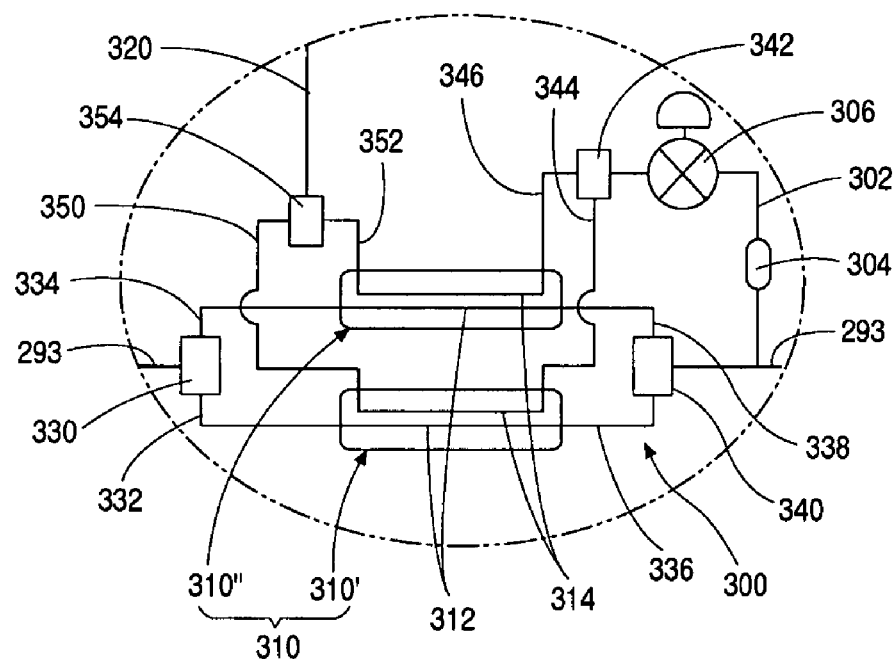
FIG. 8 is a schematic circuit diagram of the air-cooler of FIG. 7.

The following will describe the refrigerant flow in the over-cooler 300 with reference to FIGS. 7 and 8. FIG. 8 is a circuit diagram illustrating a structure of the over-cooler 300 when the over-cooling pipes are arranged in parallel.

When the air conditioner is in a cooling mode operation, the refrigerant (main refrigerant) passing through the second heat exchanger 260 is further cooled while passing through the over-cooler 300.

In more detail, the refrigerant (main refrigerant) discharged from the second heat exchanger 260 flows along the refrigerant pipe 293 and divided into two branches. The branch refrigerants are respectively introduced into the first and second over-cooling pipes 310' and 310" along the respective first and second refrigerant inflow pipes 332 and 332.

The refrigerant (main refrigerant) introduced into the over-cooling pipes 310 through the respective first and second refrigerant inflow pipes 332 and 334 flows along the respective inner pipes 312 of the first and second over-cooling pipes 310' and 310". The refrigerant passing through the inner pipes 312 of the over-cooling pipes 310 flows along the first and second refrigerant outflow pipes 336 and 338 and merges at the common pipes 340. Then, the refrigerant flows along the refrigerant pipe 293.

Meanwhile, a portion of the refrigerant (main refrigerant) flowing along the refrigerant pipe 293 after passing through the inner pipes 312 flows back by the reverse transfer pipe 302.

The branch refrigerant is further cooled while passing through the expansion portion 304. This cooled refrigerant flows upward along the outer pipes 314 of the over-cooling pipe 310. That is, the refrigerant (branch refrigerant) passing through the over-cooling valve 306 is divided into two branches by the reverse dispensing unit 342 and flows along the first and second reverse transfer pipes 344 and 346, after which the refrigerant is introduced into the outer pipes 314 of the first and second over-cooling pipes 310' and 310".

The refrigerant introduced into the over-cooling pipes 310 flows upward, in the course of which the heat exchange occurs. That is, the relatively low temperature refrigerant (branch refrigerant) flows along the outer pipes 314 and the relatively high temperature refrigerant (main refrigerant) flows along the inner pipes 312. Therefore, the main refrigerant flowing along the inner pipes 312 is heat-exchanged with the branch refrigerant flowing along the outer pipes 314, thereby being further cooled.

A temperature of the branch refrigerant flowing along the outer pipes and taking the heat from the main refrigerant flowing along the inner pipes 312 increases. The high temperature branch refrigerant is discharged through the first and second recovery pipes 350 and 352 and merges at the reverse common pipe 354, after which the refrigerant flows along the over-cooling recovery pipe 320.

Figure 9:
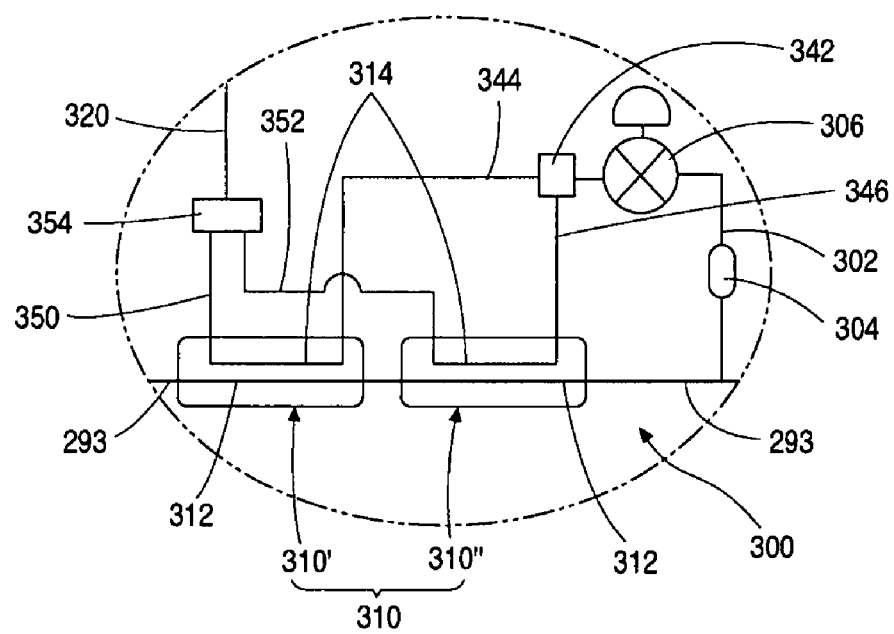
FIG. 9 is a circuit diagram illustrating a case where the over-cooler has a plurality of over-cooler pipes that are arranged in series.

FIG. 9 is a circuit diagram of an over-cooler according to another embodiment of the present invention, when the over-cooling pipes are arranged in series.

As shown in FIG. 9, like the above-described over-cooler of the foregoing embodiment, each of first and second over-cooling pipes 310' and 310" of this embodiment includes inner and outer pipes 312 and 314. However, in this embodiment, since there is no need to divide the refrigerant pipe 293 into two branches, the dispensing unit 330 and the common pipe 340 are not required.

Therefore, the refrigerant (main refrigerant) discharged from the second heat exchanger 260 passes through the inner pipes 312 of the first and second over-cooling pipes 310' and 310" successively.

A portion of the refrigerant (branch refrigerant) flows back through the reverse transfer pipe 302, in the course of which the refrigerant is further cooled. This cooled refrigerant flows upward along the outer pipes 314 of the over-cooling pipe 310. That is, the refrigerant passing through the over-cooling valve 306 is divided into two branches by the reverse dispensing unit 342 and flows along the first and second reverse transfer pipes 344 and 346, after which the refrigerant is introduced into the outer pipes 314 of the first and second over-cooling pipes 310' and 310".

The refrigerant (branch refrigerant) introduced into the outer pipes 314 of the over-cooling pipes 310 flows upward, in the course of which the heat exchange occurs. That is, the main refrigerant flowing along the inner pipes 312 is heat-exchanged with the branch refrigerant flowing along the outer pipes 314, thereby being further cooled.

A temperature of the branch refrigerant flowing along the outer pipes 314 and taking the heat from the main refrigerant flowing along the inner pipes 312 increases. The high temperature branch refrigerant is discharged through the first and second recovery pipes 350 and 352 and merges at the reverse common pipe 354, after which the refrigerant is directed to the accumulator 284 through the over-cooling recovery pipe 320.

In another embodiment, the over-cooling pipes 310 of the over-cooler 300 may be arranged in a combination of a parallel manner and a series manner.

Figure 10:
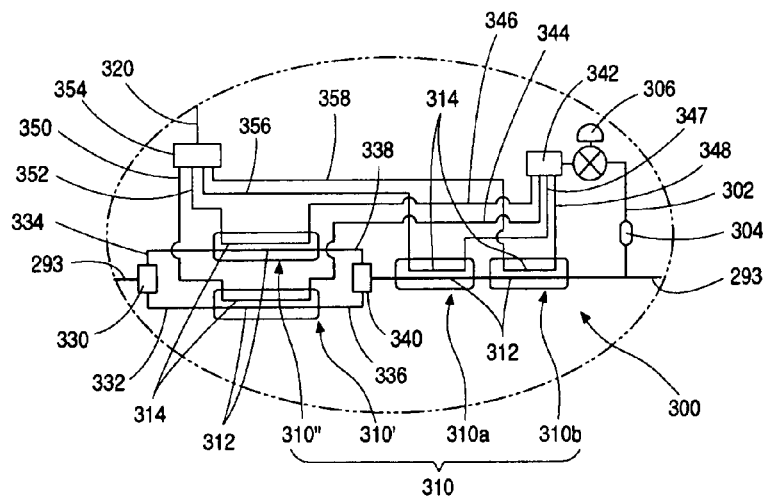
FIG. 10 is a circuit diagram illustrating a case where the over-cooler has a plurality of over-cooler pipes that are arranged in a combination of a series manner and a parallel manner.

FIG. 10 shows an over-cooler where over-cooling pipes 310 are arranged in a combination of a parallel manner and a series manner according to another embodiment of the present invention.

As shown in FIG. 10, the over-cooler 300 of this embodiment corresponds to a combination of the embodiment of FIGS. 7 and 8 where the cooling pipes are arranged in parallel and the embodiment of FIG. 9 where the cooling pipes are arranged in series. Therefore, like reference numbers will be used to refer to line parts, and a detailed description thereof will be omitted herein.

Referring to FIG. 10, the first and second over-cooling pipes 310' and 310" are connected in parallel. This structure is identical to that of the embodiment of FIGS. 7 and 8.

However, in this embodiment, a series structure as of FIG. 9 is added. That is, third and fourth over-cooling pipes 310a and 310b that are connected in series are further installed. That is, as shown in FIG. 10, the third and fourth over-cooling pipes 310a and 310b are connected to the second over-cooling pipe 310" in series.

Like the first and second over-cooling pipes 310' and 310", each of the third and fourth over-cooling pipes 310a and 310b includes inner and outer pipes 312 and 314. The inner pipes 312 communicate with the refrigerant pipe 293 and the outer pipes 314 communicate with the reverse transfer pipe 302.

Therefore, the reverse dispensing unit 342 includes third and fourth reverse transfer pipe 347 and 348 are further connected to the reverse dispensing unit 342 to allow the refrigerant to flow back to the outer pipes 314 of the third and fourth over-cooling pipes 310a and 310b. The third and fourth pipes 356 and 358 are further connected to the reverse common pipe 354 to guide the refrigerant discharged from the outer pipes 314 of the third and fourth over-cooling pipes 310a and 310b.

Then, the refrigerant (main refrigerant) discharged from the second heat exchanger 260 is divided at the dispensing unit 330 and passes through one of the first and second over-cooling pipes 310' and 310", after which the refrigerant passes through the third and fourth over-cooling pipes 310a and 310b successively.

Next, the refrigerant (main refrigerant) flows along the refrigerant pipe 293 and is then directed into the indoor unit 100. A portion of the refrigerant (branch refrigerant) flows back along the reverse transfer pipe 302 and is cooled while passing through the expansion portion 304. This cooled refrigerant flows upward along the outer pipes 314 of the over-cooling pipe 310 via the over-cooling valve 306.

That is, the refrigerant (branch refrigerant) passing through the over-cooling valve 306 is branched off from the reverse dispensing unit 342 to the first, second, third, and fourth reverse transfer pipes 344, 346, 347, and 348, after which the refrigerant is further directed to the outer pipes 314 of the first, second, third, and fourth over-cooling pipes 310', 310", 310a, and 310b.

The refrigerant (branch refrigerant) passing through the outer pipes 314 take heat from the refrigerant (main refrigerant) passing through the inner pipes 312. That is, the relatively low temperature refrigerant (branch refrigerant) flows along the outer pipes 314 and the relatively high temperature refrigerant (main refrigerant) flows along the inner pipes 312. Therefore, the main refrigerant flowing along the inner pipes 312 is heat-exchanged with the branch refrigerant flowing along the outer pipes 314, thereby being further cooled.

A temperature of the branch refrigerant flowing along the outer pipes and taking the heat from the main refrigerant flowing along the inner pipes 312 increases. The high temperature branch refrigerant is discharged through first, second, third, and further recovery pipes 350, 352, 356, and 358 and merges at the reverse common pipe 354, after which the refrigerant is introduced into the accumulator 284 while flowing along the over-cooling recovery pipe 320.

When the over-cooling pipes 310 are arranged in the combination of the parallel and series manners, a case where only one expansion portion 304 and one over-cooling valve 306 are use is illustrated. However, a plurality of expansion portions 304 for the parallel and series manners and a plurality of over-cooling valves 306 for the parallel and series manners may be used.

In this embodiment, the refrigerant (branch refrigerant) flowing along the reverse transfer pipe 302 further flows along the outer pipes 314 of the over-cooling pipes 310. The refrigerant (main refrigerant) flowing along the refrigerant pipe 293 further flows along the inner pipes 312 of the over-cooling pipes 310. However, an opposite case will be also possible.

That is, it will be also possible that the refrigerant (branch refrigerant) flowing along the reverse transfer pipe 302 further flows along the inner pipes 312 of the over-cooling pipes 310. The refrigerant (main refrigerant) flowing along the refrigerant pipe 293 further flows along the outer pipes 314 of the over-cooling pipes 310.

According to the present invention, a directional control unit for allowing the refrigerant and the cooling water always flows in an opposite direction in the second heat exchanger 260. That is, a refrigerant directional control unit 400 and a water direction control unit 410 are further provided to selectively convert the flow direction of the refrigerant or the water so that the refrigerant and the water always flow in an opposite direction, thereby improving the heat exchange efficiency.

Figure 11:
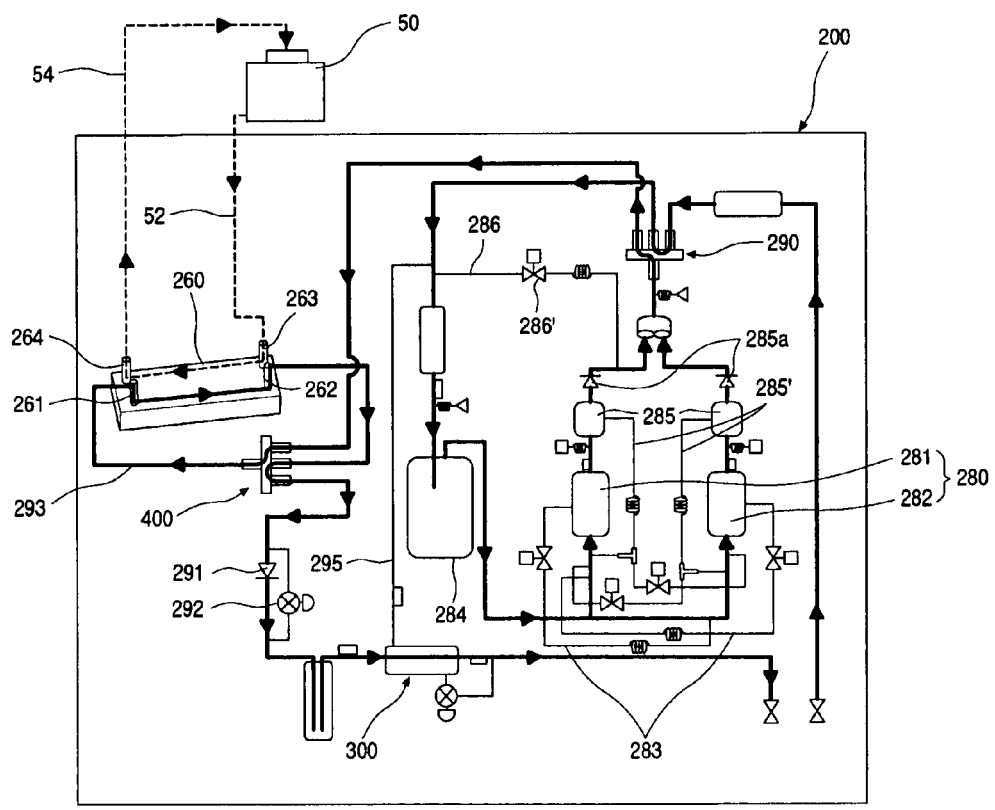
FIG. 11 is a circuit diagram illustrating a refrigerant flow controlled by a refrigerant directional control unit in a cooling mode operation of the air conditioner of FIG. 2.

FIG. 11 shows an example where the flow of the refrigerant introduced into the second heat exchanger 260 is selectively controlled.

As shown in FIG. 11, the refrigerant directional control unit 400 is connected to a pipe by which one of the ports of the refrigerant control valve 290 is connected to the second heat exchanger 260.

The refrigerant control unit 400 may be formed of a variety of devices that can convert the flow direction of the refrigerant introduced into the second heat exchanger 260. In the following description, a case where a four-way valve is applied to the refrigerant directional control valve 400 will be explained.

One of ports of the refrigerant directional control unit 400 using the four-way valve is connected to one of the ports of the refrigerant control valve 290 by a pipe. Another port of the refrigerant directional control unit 400 is connected to the left refrigerant inflow/outflow portion 261 of the second heat exchanger 260. Another port of the refrigerant directional control unit 400 is connected to the right refrigerant inflow/outflow portion 262 of the second heat exchanger 260. Another port of the refrigerant directional control unit 400 is connected to the first heat exchanger 160.

Figure 12:
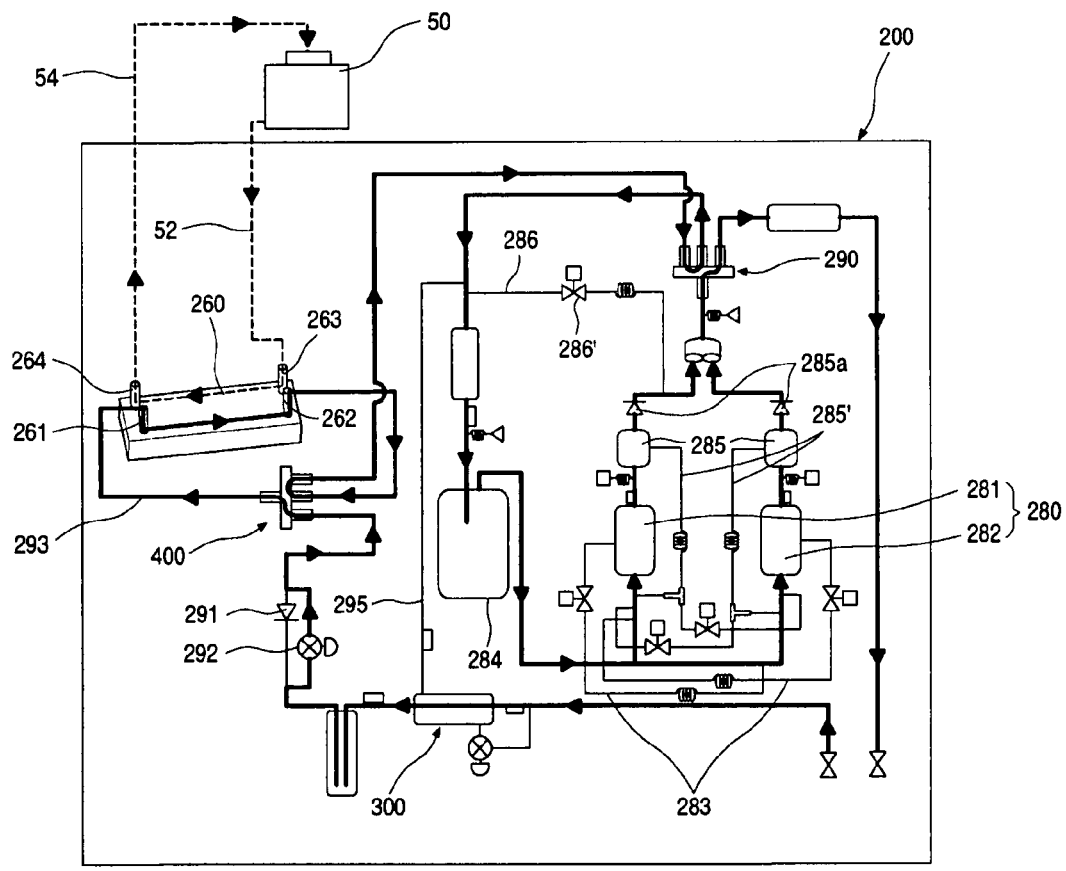
FIG. 12 is a circuit diagram illustrating a refrigerant flow controlled by a refrigerant directional control unit in a heating mode operation of the air conditioner of FIG. 2.

The following will describe a refrigerant flow state in the outdoor unit 200 including the refrigerant directional control unit 400 with reference to FIGS. 11 and 12.

FIG. 11 is a circuit diagram illustrating a refrigerant flow controlled by the refrigerant directional control unit in a cooling mode operation of the air conditioner, and FIG. 12 is a circuit diagram illustrating a refrigerant flow controlled by the refrigerant directional control unit in a heating mode operation of the air conditioner.

Referring to FIGS. 3 and 11, in order to operate the water-cooled air conditioner with the cooling mode, the user applies external electric power to the air conditioner. Then, the compressor operates 280 to compress the refrigerant to a high temperature/pressure state.

The refrigerant compressed by the compressor 280 passes through the oil separator 285, in the course of which oil contained in the refrigerant is separated. Then, the refrigerant flows to the refrigerant control valve 290 and the oil separated in the oil separator 285 is returned to the compressor through the oil recovery pipe 285'.

The refrigerant directed to the refrigerant control valve 290 flows to the refrigerant direction control unit 400 along a pipe connected to one of the ports of the refrigerant control valve 290.

The refrigerant directed to the left refrigerant directional control unit 261 is introduced into the second heat exchanger 260 through the left refrigerant inflow/outflow portion 261 and is then discharged out of the second heat exchanger 260 through the right refrigerant inflow/outflow portion 262. Then, the refrigerant is directed to the refrigerant directional control unit 400 and is then introduced into the over-cooler 300 via the outdoor check valve 291.

The refrigerant is over-cooled while passing through the over-cooler 300 and is then directed into the indoor unit 100 along the refrigerant pipe. The refrigerant directed into the indoor unit 100 is reduced in pressure while passing through the expansion valve (not shown) mounted on an inlet of the first heat exchanger 160 and then introduced into the first heat exchanger 160. The refrigerant introduced into the first heat exchanger 160 is heat-exchanged with indoor air. The heat-exchanged refrigerant flows to the outdoor unit 200 along the refrigerant pipe 293 and then to the refrigerant control valve 290 along a pipe connected to one of the ports of the refrigerant control valve 290.

The refrigerant directed to the refrigerant control valve 290 is introduced into the accumulator 284 along a pipe connected to another one of the ports of the refrigerant control valve 290.

Only the gas-phase refrigerant of the refrigerant introduced into the accumulator 284 is directed into the compressor 280.

This refrigerant flow is repeated during the cooling mode operation of the air conditioner to realize a cooling cycle.

The refrigerant flow in the heating mode operation will now be described with reference to FIGS. 3 and 12.

When the electric power is applied for the heating mode operation of the air conditioner, the compressor 280 compresses the refrigerant to a high temperature/pressure state.

The refrigerant compressed by the compressor 280 passes through the oil separator 285, in the course of which oil contained in the refrigerant is separated. Then, the refrigerant flows to the refrigerant control valve 290 and the oil separated in the oil separator 285 is returned to the compressor through the oil recovery pipe 285'.

The refrigerant passing through the oil separator 285 is directed to the refrigerant control valve 290 and is then introduced into the first heat exchanger 160 along the refrigerant pipe 300 connected to the indoor unit 100. The refrigerant introduced into the first heat exchanger 160 is heat-exchanged with the indoor air to be phase-changed into a low temperature/high pressure liquid refrigerant. The heat-exchanged refrigerant passes through an expansion valve (not shown).

The refrigerant passing through the expansion valve (not shown) is directed to the outdoor unit 200 along the refrigerant pipe 300. The refrigerant directed to the outdoor unit 200 passes through the outdoor electronic valve 292 to be expanded and is directed to the refrigerant direction control unit 400 through one of the ports of the refrigerant directional control unit 400.

The refrigerant directed to the refrigerant directional control unit 400 is introduced into the second heat exchanger 260 through the left refrigerant inflow/outflow portion 261 and is directed again into another one of the ports of the refrigerant directional control unit 400 through the right refrigerant inflow/outflow portion 262. The refrigerant directed to the refrigerant directional control unit 400 is directed to one of the ports of the refrigerant control valve 290 through another one of the ports of the refrigerant directional control unit 400. The low temperature/pressure refrigerant passing through the second heat exchanger 260 is heat exchanged with the cooling water to be phase-changed into the low temperature/pressure gas-phase state. The refrigerant is directed to the refrigerant control valve 290 in a state where it is in the low temperature/pressure gas-phase state.

The refrigerant flowing into one of the ports of the refrigerant control valve 290 is introduced into the accumulator 284 through another one of the ports of the refrigerant control valve 290. Only the gas-phase refrigerant of the refrigerant introduced into the accumulator 284 is introduced into the compressor 280 to realize the heating cycle.

Meanwhile, the cooling water cooled in the cooling tower 50 flows along the cooling water supply pipe 52 and further flows to the second heat exchanger 260 via the right water inflow/outflow portion 263. The refrigerant flowing into the second heat exchanger 260 is returned into the cooling tower 50 along the cooling water recovery pipe 54 via the left water inflow/outflow portion 264.

At this point, the cooling water is introduced into the second heat exchanger 260 through the right water inflow/outflow portion 263 formed in the second heat exchanger 260 and is discharged out of the second heat exchanger 260 through the left water inflow/outflow portion 264. That is, the cooling water flows from a left end to a right end of the second heat exchanger 260.

In addition, the refrigerant is introduced into the second heat exchanger 260 through the left refrigerant inflow/outflow portion 261 formed in the second heat exchanger 260 and is discharged out of the second heat exchanger 260 through the right refrigerant inflow/outflow portion 262. That is, the refrigerant flows from a right end to a left end of the second heat exchanger 260.

Therefore, the refrigerant and the cooling water are heat-exchanged with each other while always flowing in an opposite direction to each other in the second heat exchanger 260.

Figure 13:
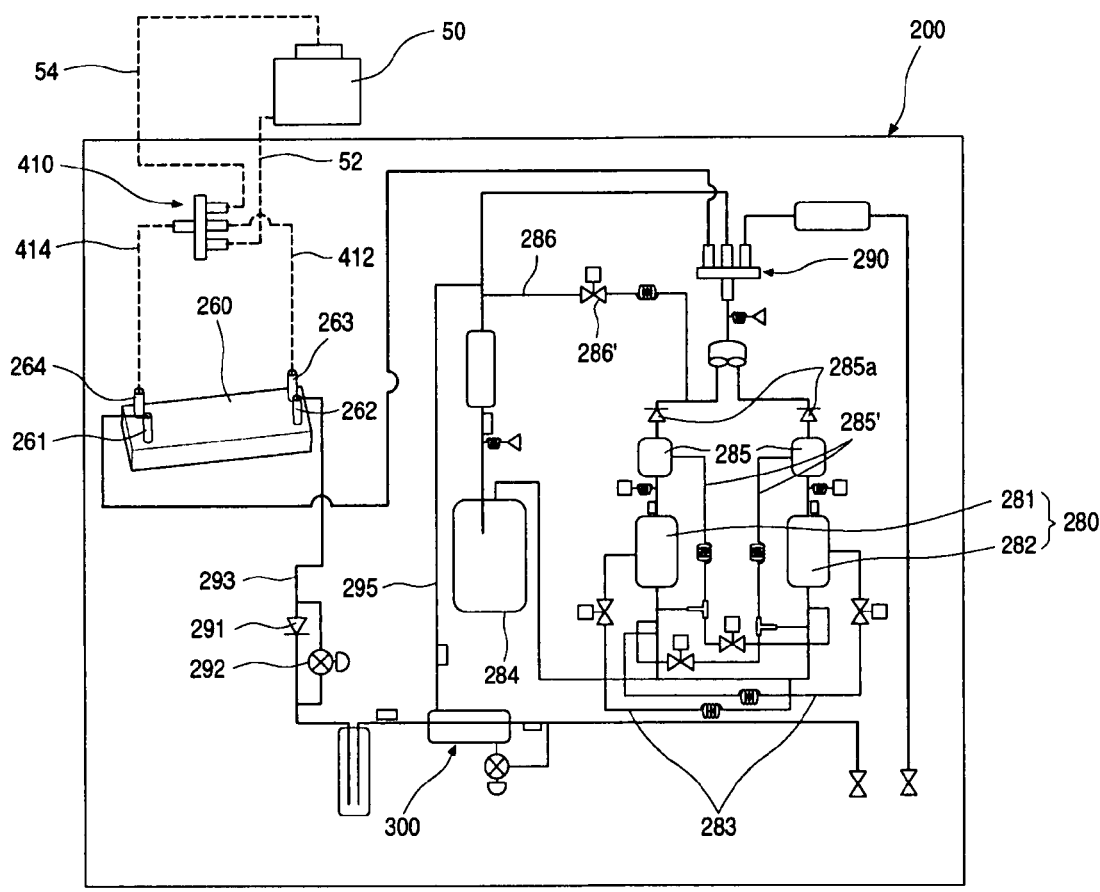
FIG. 13 is a circuit diagram illustrating a state where a water directional control unit is provided in an outdoor unit of the air conditioner of FIG. 2.

FIG. 13 shows a modified example where a water directional control unit 410 instead of the refrigerant directional control unit is used as the directional control unit. That is, in order to allow the refrigerant and the cooling water to always flow in an opposite direction to each other in the second heat exchanger 260, the flow direction of the cooling water rather than the refrigerant is selectively changed.

As described above, in FIG. 13, a case where the refrigerant and the cooling water always flow in an opposite direction to each other by selectively changing the flow direction of the water introduced into the second heat exchanger 260 is illustrated.

As shown in FIG. 13, the water directional control unit 410 is formed to communicate with opposite ends of the cooling tower 50 and opposite ends of the second heat exchanger 260. Therefore, the water direction control unit 410 selectively changes the flow direction of the water coming in and out the second heat exchanger 260.

In more detail, the cooling water supply pipe 52 and the cooling water recovery pipe 54 reconnected to the water directional control unit 410. Like the refrigerant directional control unit 400, the water directional control unit 410 is formed of a four-way valve having ports that are respectively connected to the cooling water supply pipe 52, the cooling water recovery pipe 54, the right water inflow/outflow portion 263, and the left water inflow/outflow portion 264.

A right guide pipe 412 is connected between the water directional control unit 410 and the right water inflow/outflow portion 263 to guide the flow of the water. A left guide pipe 414 is connected between the water directional control unit 410 and the left water inflow/outflow portion 264 to guide the flow of the water.

Figure 14:
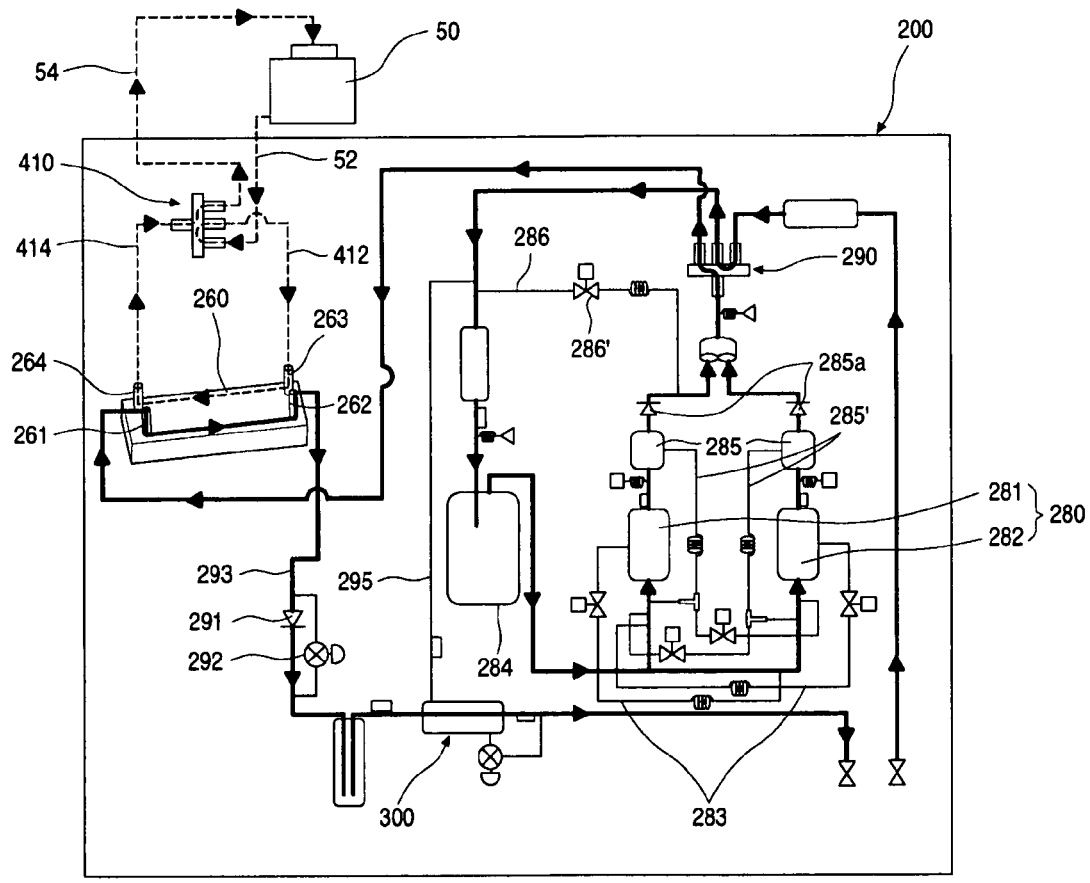
FIG. 14 is a circuit diagram illustrating a refrigerant flow and a water flow in an cooling mode operation of the air conditioner in FIG. 13.
Figure 15:
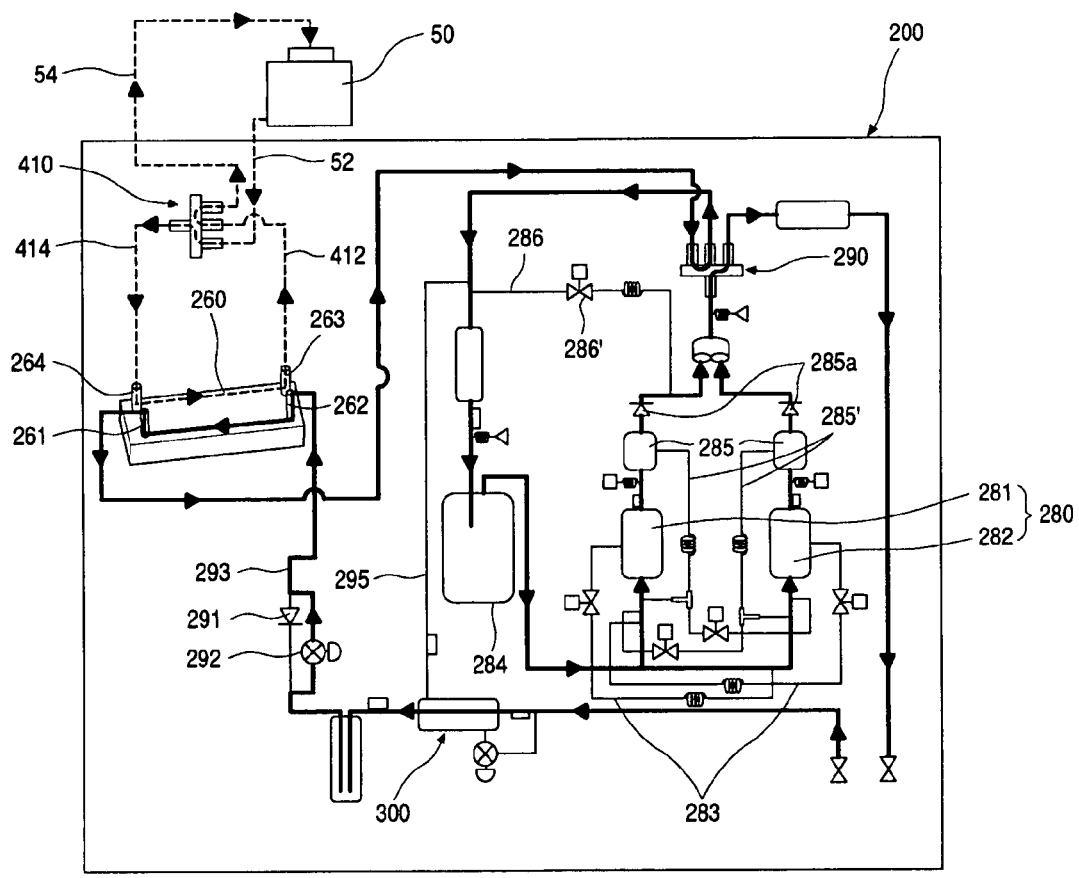
FIG. 15 is a circuit diagram illustrating a refrigerant flow and a water flow in a heating mode operation of the air conditioner in FIG. 13.

Therefore, the water directional control unit 410 selectively converts the flow direction of the water introduced into the second heat exchanger 260 as shown in FIGS. 14 and 15.

For example, when the air conditioner is in the cooling mode operation and thus the refrigerant flows from a left side to a right side in the second heat exchanger 260, the water flows from the right side to the left side in the second heat exchanger 260. That is, the cooling water flowing from the cooling tower 50 along the cooling water supply pipe 52 is guided to the right guide pipe 412 via the water directional control unit 410.

Therefore, the water flowing along the right guide pipe 412 is introduced into the second heat exchanger 260 through the right water inflow/outflow portion 263 and flows leftward to be heat-exchanged with the refrigerant. Then, the water is discharged through the left water inflow/outflow portion 264 and flows along the left guide pipe 414. The water flowing along the left guide pipe 414 passes through the water directional control unit 410 and flows along the cooling water recovery pipe 54 to be guided to the cooling tower 50.

When the air conditioner is in the heating mode operation as shown in FIG. 15, the flow of the water in the second heat exchanger 260 is opposite to that in the cooling mode operation. That is, the refrigerant flows from the right side to the left side in the second heat exchanger 260. Therefore, the flow direction of the second heat exchanger 260 is controlled from the left side to the right side in the second heat exchanger 260.

In more detail, the cooling water flowing from the cooling tower 50 along the cooling water supply pipe 52 is converted in a flow direction while passing through the water directional control unit 410 and is thus guided to the left guide pipe 414.

The water guided to the left guide pipe 414 is introduced into the second heat exchanger 260 through the left water inflow/outflow portion 264 and flows rightward to be heat-exchanged with the refrigerant. Then, the water is discharged through the right water inflow/outflow portion 263 and flows to the right guide pipe 412. The water flowing along the right guide pipe 412 passes through the water directional control unit 410 and flows along the cooling water recovery pipe 54 to be guided to the cooling tower.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A water-cooled air conditioning system comprising:
an air conditioner to condition the air in an indoor space;
a plurality of panels defining an appearance of the air conditioner;
a dividing plate dividing an internal space formed by the plurality of panels into two spaces;
a heat exchanger installed in one of the two spaces, for heat exchange between indoor air and refrigerant;
a plate type heat exchanger installed in the other of the two spaces for heat exchange between water cooled in a cooling tower and the refrigerant, the plate type heat exchanger formed with a plurality of thin plates separated from one another by predetermined gaps that form spaces through which refrigerant and water flow, wherein the water flows through the plate type heat exchanger and the cooling tower when the air conditioner operates, and wherein the water does not flow through the plate type heat exchanger and the cooling tower when the air conditioner does not operate;
a plurality of compressors to compress the refrigerant, wherein the plurality of compressors include:
a constant speed compressor that operates with a constant speed; and
an inverter compressor that operates with a variable speed,
wherein the inverter compressor operates and the constant speed compressor does not operate when a load capacity is relatively low, and
wherein the constant speed compressor and the inverter compressor operate together when the load capacity increases;
a supply pipe connecting the cooling tower to the air conditioner and guiding water from the cooling tower to the air conditioner; and a recovery pipe connecting the air conditioner to the cooling tower and guiding water from the air conditioner to the cooling tower, the recovery pipe including at least one branch pipe extending from the recovery pipe into the air conditioner and a valve provided at the at least one branch pipe, wherein the valve is closed such that water in the air conditioner does not flow into the recovery pipe through the valve when the air conditioner does not operate.

2. The water-cooled air conditioning system according to claim 1, further comprising a discharge duct for guiding the air heat-exchanged in the heat exchanger to the indoor space, wherein the discharge duct is provided with a discharge damper for controlling an amount of air discharged to the indoor space.

3. The water-cooled air conditioning system according to claim 1, further comprising an outdoor air intake hole through which fresh outdoor air is introduced into the indoor space through the air conditioner.

4. The water-cooled air conditioning system according to claim 3, wherein the outdoor air intake hole is provided with an outdoor air damper for allowing the outdoor air to be selectively introduced in accordance with a degree of freshness of the air in the indoor space.

5. The water-cooled air conditioning system according to claim 1, further comprising a directional control unit for allowing the water and the refrigerant to always flow in an opposite direction to each other in the plate type heat exchanger.

6. The water-cooled air conditioning system according to claim 5, wherein the directional control unit includes a four-way valve for selectively converting a flow direction of the water or the refrigerant introduced into the plate type heat exchanger.

7. The water-cooled air conditioning system according to claim 5, wherein the directional control unit includes a refrigerant directional control unit for selectively converting a flow direction of the refrigerant introduced into the plate type heat exchanger.

8. The water-cooled air conditioning system according to claim 5, wherein the directional control unit includes a water direction control unit for selectively converting a flow direction of the water introduced into the plate type heat exchanger.

9. The water-cooled air conditioning system according to claim 1, further comprising an over-cooler for further cooling the refrigerant that is heat-exchanged in the plate type heat exchanger.

10. The water-cooled air conditioning system according to claim 9, wherein the over-cooler includes a plurality of over-cooling pipes that are arranged in parallel.

11. The water-cooled air conditioning system according to claim 9, wherein the over-cooler includes a plurality of over-cooling pipes that are arranged in series.

12. The water-cooled air conditioning system according to claim 9, wherein the over-cooler includes a plurality of over-cooling pipes that are arranged in a combination of a parallel manner and a series manner.

* * * * *